US011816575B2

(12) United States Patent
Gu et al.

(10) Patent No.: US 11,816,575 B2
(45) Date of Patent: Nov. 14, 2023

(54) VERIFIABLE DEEP LEARNING TRAINING SERVICE

(71) Applicant: International Business Machines Corporation, Armonk, NY (US)

(72) Inventors: Zhongshu Gu, Ridgewood, NJ (US); Heqing Huang, Mahwah, NJ (US); Jialong Zhang, San Jose, CA (US); Dong Su, Sunnyvale, CA (US); Dimitrios Pendarakis, Westport, CT (US); Ian M. Molloy, Chappaqua, NY (US)

(73) Assignee: International Business Machines Corporation

( * ) Notice: Subject to any disclaimer, the term of this patent is extended or adjusted under 35 U.S.C. 154(b) by 1265 days.

(21) Appl. No.: 16/124,657

(22) Filed: Sep. 7, 2018

(65) Prior Publication Data
US 2020/0082270 A1 Mar. 12, 2020

(51) Int. Cl.
*G06N 3/084* (2023.01)
*G06F 21/60* (2013.01)

(52) U.S. Cl.
CPC .......... *G06N 3/084* (2013.01); *G06F 21/602* (2013.01)

(58) Field of Classification Search
CPC .............................. G06N 3/084; G06F 21/602
See application file for complete search history.

(56) References Cited

U.S. PATENT DOCUMENTS

| 2014/0189808 | A1* | 7/2014 | Mahaffey | G06F 21/31 726/4 |
| 2016/0379115 | A1 | 12/2016 | Burger et al. | |
| 2017/0228645 | A1 | 8/2017 | Wang et al. | |
| 2017/0372201 | A1* | 12/2017 | Gupta | G06N 3/0454 |
| 2017/0372226 | A1* | 12/2017 | Costa | G06F 21/6245 |

(Continued)

OTHER PUBLICATIONS

Tramer et al., Slalom: Fast, Verifiable and Private Execution of Neural Networks in Trusted Hardware, Jun. 2018. (Year: 2018).*

(Continued)

*Primary Examiner* — Marshall L Werner
(74) *Attorney, Agent, or Firm* — Stephen J. Walder, Jr.; Jeffrey S. LaBaw

(57) ABSTRACT

Deep learning training service framework mechanisms are provided. The mechanisms receive encrypted training datasets for training a deep learning model, execute a FrontNet subnet model of the deep learning model in a trusted execution environment, and execute a BackNet subnet model of the deep learning model external to the trusted execution environment. The mechanisms decrypt, within the trusted execution environment, the encrypted training datasets and train the FrontNet subnet model and BackNet subnet model of the deep learning model based on the decrypted training datasets. The FrontNet subnet model is trained within the trusted execution environment and provides intermediate representations to the BackNet subnet model which is trained external to the trusted execution environment using the intermediate representations. The mechanisms release a trained deep learning model comprising a trained FrontNet subnet model and a trained BackNet subnet model, to the one or more client computing devices.

19 Claims, 9 Drawing Sheets

(56) References Cited

U.S. PATENT DOCUMENTS

2019/0042878 A1* 2/2019 Sheller .................. G06F 16/951

OTHER PUBLICATIONS

Ohrimenko et al., Oblivious Multi-Party Machine Learning on Trusted Processors, 25th USENIX Security Symposium (USENIX Security 16), pp. 619-636, Aug. 2016. (Year: 2016).*
Fung et al., Mitigating Sybils in Federated Learning Poisoning, Aug. 2018. (Year: 2018).*
Tamraker et al., The Circle Game: Scalable Private Membership Test Using Trusted Hardware, Feb. 2017 (Year: 2017).*
Abadi, Martin et al., "Deep Learning with Differential Privacy", Proceedings of the 2016 ACM SIGSAC Conference on Computer and Communications Security (CCS '16), Oct. 24-28, 2016, pp. 308-318, submitted version from arXiv: 1607.00133v2 [stat.ML], Oct. 24, 2016, 11 pages.
Anati, Ittai et al., "Innovative Technology for CPU Based Attestation and Sealing", In Proceedings of the 2nd International Workshop on Hardware and Architectural Support for Security and Privacy, Jun. 2013, 7 pages.
Bagdasaryan, Eugene et al., "How to Backdoor Federated Learning", ArXiv preprint arXiv:1807.00459v3, Aug. 2019, 15 pages.
Biggio, Battista et al., "Poisoning Attacks against Support Vector Machines", 29th International Conference on Machine Learning (ICML), Mar. 2013, 8 pages.
Bittau, Andrea et al., "Prochlo: Strong Privacy for Analytics in the Crowd", In Proceedings of the 26th Symposium on Operating Systems Principles, ACM, Oct. 2017, 19 pages.
Bonawitz, Keith et al., "Practical Secure Aggregation for Privacy-Preserving Machine Learning", In Proceedings of the 2017 ACM SIGSAC Conference on Computerand Communications Security, Oct.-Nov. 2017, 17 pages.
Brenner, Stefan et al., "Securekeeper: Confidential Zookeeper Using Intel SGX", In Proceedings of the 17th International Middleware Conference, Dec. 2016, 13 pages.
Chen, Guoxing et al., "SgxPectre Attacks: Leaking Enclave Secrets via Speculative Execution", arXiv Preprint arXiv:1802.09085, Feb. 2018, 17 pages.
Chen, Xinyun et al., "Targeted Backdoor Attacks on Deep Learning Systems Using Data Poisoning", Cornell University Library, arXiv:1712.05526v1 [cs.CR], Dec. 15, 2017, 18 pages.
Costan, Victor et al., "Intel SGX Explained", IACR Cryptology ePrint Archive, Jan. 2016, 117 pages.
Denton, Emily et al., "Exploiting Linear Structure within Convolutional Networks for Efficient Evaluation", In Advances in Neural Information Processing Systems, arXiv: 1404.0736v2, Jun. 2014, 11 pages.
Dosovitskiy, Alexey et al., "Inverting Visual Representations with Convolutional Networks", In IEEE Conference on Computer Vision and Pattern Recognition, arXiv:1506.02753v4, Apr. 2016, 15 pages.
Fredrikson, Matt et al., "Model Inversion Attacks that Exploit Confidence Information and Basic Countermeasures", ACM Conference on Computer and Communications Security (CCS'15), Oct. 12-16, 2015, 12 pages.
Fuhry, Benny et al., "Hardidx: Practical and Secure Index with SGX", In Data and Applications Security and Privacy XXXI: 31st Annual IFIP WG 11.3 Conference Jul. 2017, arXiv:1703.04583v1, Mar. 14, 2017, 16 pages.
Fung, Clement et al., "Mitigating Sybils in Federated Learning Poisoning", arXiv preprint arXiv:1808.04866v4, May 2019, 16 pages.
Goodfellow, Ian J. et al., "Generative Adversarial Nets", Advances in Neural Information Processing Systems (NIPS 2014), Dec. 8-13, 2014, 9 pages.
Gu, Zhongshu et al., "Securing Input Data of Deep Learning Inference Systems via Partitioned Enclave Execution", arXiv:1807.00969v1, Jul. 2018, 14 pages.
Gueron, Shay, "A Memory Encryption Engine Suitable for General Purpose Processors", IACR Cryptology ePrint Archive. [Online]. Available: http://eprint.iacr.org/2016/204, Feb. 2016, 14 pages.
Gupta, Debayan et al., "Using Intel Software Guard Extensions for Efficient Two-Party Secure Function Evaluation", In International Conference on Financial Cryptography and Data Security Feb. 2016, 16 pages.
Han, Song et al., "Deep Compression: Compressing Deep Neural Networks with Pruning", Trained Quantization and Huffman Coding, arXiv:1510.00149v5, Feb. 2016, 14 pages.
Han, Song et al., "Learning both Weights and Connections for Efficient Neural Networks", In Advances in Neural Information Processing Systems, arXiv:1506.02626v3, Oct. 2015, 9 pages.
Hayes, Jamie et al., "Contamination Attacks and Mitigation in Multi-Party Machine Learning", 32nd Conference on Neural Information Processing Systems, Dec. 2018, 14 pages.
Hitaj, Briland et al., "Deep Models Under the GAN: Information Leakage from Collaborative Deep Learning", ACM Conference on Computerand Communications Security (CCS'17), Oct. 30-Nov. 3, 2017, 16 pages.
Hunt, Tyler et al., "Chiron: Privacy-Preserving Machine Learning as a Service", arXiv preprint arXiv:1803.05961, Mar. 2018, 15 pages.
Hynes, Nick et al., "Efficient Deep Learning on Multi-Source Private Data", ArXiv preprint, arXiv:1807.06689v1, Jul. 2018, 7 pages.
Iandola, Forrest N. et al., "SqueezeNet: Alexnet-Level Accuracy with 50x Fewer Parameters and <0.5 MB Model Size", ArXiv:1602.07360v4, Nov. 2016, 13 pages.
Jain, Prerit et al., "OpenSGX: An Open Platform for SGX Research", In 23nd Annual Network and Distributed System Security Symposium, Feb. 2016, 16 pages.
Kucuk, Kubilay A. et al., "Exploring the Use of Intel SGX for Secure Many-Party Applications", In Proceedings of the 1st Workshop on System Software for Trusted Execution, Dec. 2016, 6 pages.
Liu, Yingqi et al., "Trojan Attack on Neural Network", https://github.com/PurduePAML/TrojanNN, 2017-2018, Accessed from the Internet Jul. 1, 2020, 6 pages.
Liu, Yingqi et al., "Trojaning Attack on Neural Networks", Network and Distributed Systems Security (NDSS) Symposium 2018, Feb. 18-21, 2018, 15 pages.
Mahendran, Aravindh et al., "Understanding Deep Image Representations by Inverting Them", Cornell University Library, arXiv: 1412.0035v1 [cs.CV], Nov. 26, 2014, 9 pages.
MckKeen, Frank et al., "Innovative Instructions and Software Model for Isolated Execution", In Proceedings of the 2nd International Workshop on Hardware and Architectural Support for Security and Privacy, Jun. 2013, 8 pages.
McKeen, Frank et al., "Intel Software Guard Extensions (Intel SGX) Support for Dynamic Memory Management Inside an Enclave", In Proceedings of the Hardware and Architectural Support for Security and Privacy, HASP, Jun. 2016, 9 pages.
McMahan, H. Brendan et al., "Communication-Efficient Learning of Deep Networks from Decentralized Data", Feb. 2016, arXiv preprint arXiv:1602.05629, Feb. 28, 2017, 11 pages.
Mei, Shike et al., "Using Machine Teaching to Identify Optimal Training-Set Attacks on Machine Learners", Proceedings of the Twenty-Ninth AAAI Conference on Artificial Intelligence, Jan. 2015, 7 pages.
Melis et al., "Exploiting Unintended Feature Leakage in Collaborative Learning", In Proceedings of 40th IEEE Symposium on Security & Privacy (S & P 2019), arXiv:1805.04049v3, Nov. 2018, 16 pages.
Mishra, Pratyush et al., "Oblix: An Efficient Oblivious Search Index", In 2018 IEEE Symposium on Security and Privacy (SP), May 2018, 18 pages.
Parkhi, Omkar M. et al., "Deep face recognition", In British Machine Vision Conference, vol. 1, 6, Jan. 2015, 12 pages.
Poddar, Rishabh et al., "SafeBricks: Shielding Network Functions in the Cloud", Proceedings of the 15th USENIX Conference on Networked Systems Design and Implementation (NSDI), Apr. 2018, 16 pages.

(56) References Cited

OTHER PUBLICATIONS

Raghu, Maithra et al., "SVCCA: Singular Vector Canonical Correlation Analysis for Deep Learning Dynamics and Interpretability", 31st Conference on Neural Information Processing Systems (NIPS), Dec. 2017, 10 pages.

Redmon, J., "Darknet: Open Source Neural Networks in C", http://pjreddie:com/darknet/, 2013-2016, Accessed from the Internet on Apr. 6, 2020, 5 pages.

Schuster, Felix et al., "VC3: Trustworthy Data Analytics in the Cloud Using SGX", In Security and Privacy (SP), 2015 IEEE Symposium on, May 2015, 17 pages.

Shokri, Reza et al., "Membership Inference Attacks Against Machine Learning Models", IEEE Symposium on Security and Privacy (S&P), May 22-24, 2017, 16 pages.

Shokri, Reza, "Privacy-Preserving Deep Learning", ACM Conference on Computerand Communications Security (CCS'15), Oct. 12-16, 2015, 12 pages.

Song, Congzheng et al., "Machine Learning Models that Remember Too Much", ACM Conference on Computerand Communications Security (CCS '17), Oct. 30-Nov. 3, 2017, pp. 587-601.

Stoica, Ion et al., "A Berkeley View of Systems Challenges for AI", ArXiv:1712.05855v1, Dec. 2017, 11 pages.

Tamrakar, Sandeep et al., "The Circle Game: Scalable Private Membership Test Using Trusted Hardware", In Proceedings of the 2017 ACM on Asia Conference on Computer and Communications Security, Apr. 2017, 14 pages.

Tramer, Florian et al., "Slalom: Fast, Verifiable and Private Execution of Neural Networks in Trusted Hardware", arXiv preprint arXiv:1806.03287, Jun. 2018, last revised Feb. 27, 2019, 19 pages.

Van Bulck, Jo et al., "Foreshadow: Extracting the Keys to the Intel SGX Kingdom with Transient Out-of-Order Execution", In Proceedings of the 27th USENIX Security Symposium. USENIX Association, Aug. 2018, 18 pages.

Volos, Stavros et al., "Graviton: Trusted Execution Environments on GPUs", In Proceedings of the 13th USENIX, Symposium on Operating Systems Design and Implementation (OSDI' 18), Oct. 2018, 16 pages.

Xiao, Huang et al., "Support Vector Machines Under Adversarial Label Contamination", Neurocomputing, vol. 160, Jul. 2014, 11 pages.

Zhang, F, "mbedtls-SGX;a SGX-friendly TLS stack", https://github.com/bl4ck5un/mbedtls-SGX, 2016-2018, Accessed from the Internet on Jul. 1, 2020, 4 pages.

Zheng, Wenting et al., "Opaque: An Oblivious and Encrypted Distributed Analytics Platform", In 14th USENIX Symposium on Networked Systems Design and Implementation, Mar. 2017, 16 pages.

Gu, Tianyu et al., "BadNets: Identifying Vulnerabilities in the Machine Learning Model Supply Chain", Cornell University Library, arXiv:1708.06733v1 [cs.CR], Aug. 22, 2017, 13 pages.

Koh, Pang W. et al., "Understanding Black-box Predictions via Influence Functions", Proceedings of the 34th International Conference on Machine Learning, Aug. 6-11, 2017, 10 pages.

Krizhevsky, Alex et al., "ImageNet Classification with Deep Convolutional Neural Networks", Advances in Neural Information Processing Systems, Jan. 2012, 9 pages.

Li, Meng et al., "PrivyNet: A Flexible Framework for Privacy-Preserving Deep Neural Network Training", Cornell University Library, arXiv:1709.06161v3 [cs.LG], Jan. 12, 2018, pp. 1-20.

Mohassel, Payman et al., "SecureML: A System for Scalable Privacy-Preserving Machine Learning", 2017 IEEE Symposium on Security and Privacy (SP), May 22-26, 2017, pp. 1-38.

Ohrimenko, Olga et al., "Oblivious Multi-Party Machine Learning on Trusted Processors", USENIX Security Symposium '16, Aug. 10-12, 2016, pp. 1-18.

Shokri, Reza et al., "Privacy-Preserving Deep Learning", ACM Conference on Computerand Communications Security (CCS '15), Oct. 12-16, 2015, 12 pages.

* cited by examiner

VERIFIABLE DEEP LEARNING TRAINING SERVICE

BACKGROUND

The present application relates generally to an improved data processing apparatus and method and more specifically to mechanisms for providing a verifiable deep learning training service.

Deep learning systems have been widely deployed as part of artificial intelligence (AI) services due to their ability to approach human performance when performing cognitive tasks. Deep learning is a class of machine learning technology that uses a cascade of multiple layers of nonlinear processing units for feature extraction and transformation. Each successive layer uses the output from the previous layer of input. The deep learning system is trained using supervised, e.g., classification, and/or unsupervised, e.g., pattern analysis, learning mechanisms. The learning may be performed with regard to multiple levels of representations that correspond to different levels of abstraction, with the levels forming a hierarchy of concepts.

Most modern deep learning models are based on an artificial neural network, although they can also include propositional formulas or latent variables organized layer-wise in deep generative models such as the nodes in Deep Belief Networks and Deep Boltzmann Machines. In deep learning, each level learns to transform its input data into a slightly more abstract and composite representation. In an facial image recognition application, for example, the raw input may be a matrix of pixels with the first representational layer abstracting the pixels and encoding edges, the second layer composing and encoding arrangements of edges, the third layer encoding a nose and eyes, and the fourth layer recognizing that the image contains a face. Importantly, a deep learning process can learn which features to optimally place in which level on its own, but this does not completely obviate the need for hand-tuning. For example, hand tuning may be used to vary the number of layers and layer sizes so as to provide different degrees of abstraction.

The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs is that of the network and is the number of hidden layers plus one (as the output layer is also parameterized). For recurrent neural networks, in which a signal may propagate through a layer more than once, the CAP depth is potentially unlimited. No universally agreed upon threshold of depth divides shallow learning from deep learning, but most researchers agree that deep learning involves a CAP depth greater than 2. CAP of depth 2 has been shown to be a universal approximator in the sense that it can emulate any function. Beyond that, more layers do not add to the function approximator ability of the network, but the extra layers help in learning features.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions that are executed by the at least one processor to configure the at least one processor to implement a deep learning training service framework. The method comprises receiving, by the deep learning training service framework, from one or more client computing devices, one or more encrypted training datasets for training a deep learning model. The method further comprises executing, by the deep learning training service framework, a FrontNet subnet model of the deep learning model in a trusted execution environment of the deep learning training service framework. Moreover, the method comprises executing, by the deep learning training service framework, a BackNet subnet model of the deep learning model in the deep learning training service framework external to the trusted execution environment. In addition, the method comprises decrypting, by a security module executing within the trusted execution environment, the one or more encrypted training datasets and training, by training logic of the deep learning training service framework, the FrontNet subnet model and BackNet subnet model of the deep learning model based on the decrypted training datasets. The FrontNet subnet model is trained within the trusted execution environment and provides intermediate representations to the BackNet subnet model which is trained external to the trusted execution environment using the intermediate representations. Furthermore, the method comprises releasing, by the deep learning training service framework, a trained deep learning model comprising a trained FrontNet subnet model and a trained BackNet subnet model, to the one or more client computing devices.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
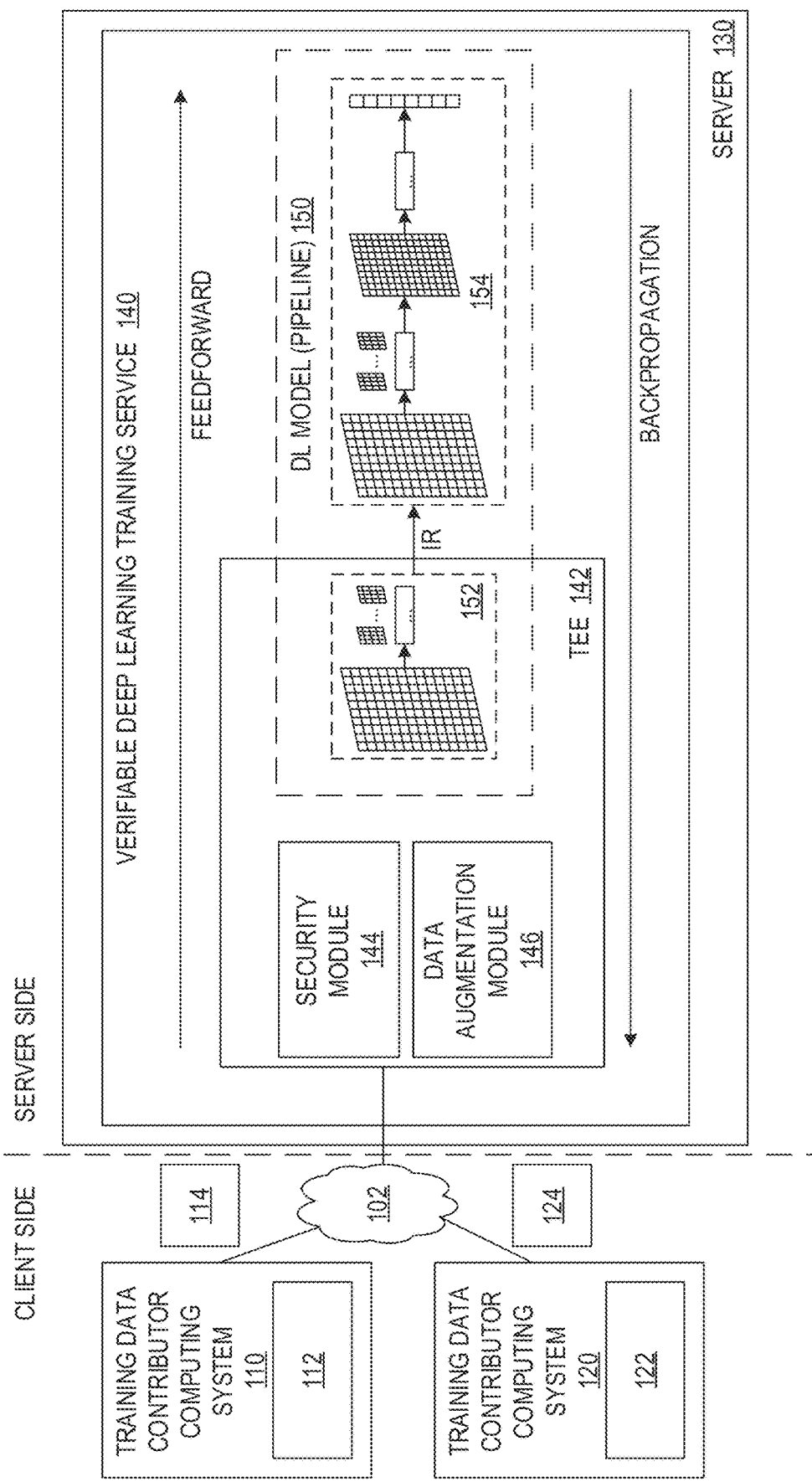
FIG. 1 is an example diagram illustrating a training stage workflow and interaction of operational components of a verifiable deep learning training cloud service in accordance with one illustrative embodiment.

Artificial intelligence (AI) systems and services utilize machine learning (ML) models, e.g., deep learning neural networks (DNNs), also referred to as deep learning models, as part of their backend engines. Large numbers of computing resources, such as graphics processing units (GPUs) and storage, are needed to perform training of these deep learning models. Individual developers or small business/academic units who intend to build their own customized deep learning models often rely on deep learning training services from large cloud service providers. However, users of training services have concerns for the confidentiality and integrity of their training data as the training data may contain sensitive or classified information which should not be exposed to the cloud service provider. In addition, users expect that the final trained deep learning model should be built only upon the training data provisioned by them and the training data should not be compromised or poisoned in the supply chain; otherwise, adversaries could embed malicious backdoors in the trained deep learning model. Such trojan logic is difficult to detect and prune by analyzing the trained deep learning model's parameters.

The abundance and diversity of training data are the key factors for building successful machine learning (ML) models. High-quality training data is a scarce resource and typically is under the control of different parties. Collaborative learning, in which multiple parties contribute their private data to jointly train a ML model with common objectives, can potentially address the problem of inadequate high-quality training resources. The various parties that collaborate in this way are referred to as training data contributors. While such collaboration provides larger training datasets upon which to perform training of the ML models, in many mission-critical and privacy-sensitive domains, such as medical care, forensic investigation, intellectual property, etc., sharing raw data is not desirable to the owners of the raw data and, in some cases, may not be permitted by law or regulations.

To satisfy the requirements of security and privacy from different training data contributors, a privacy-preserving collaborative learning mechanism should be designed. In designing such a privacy-preserving collaborative learning mechanism, before training of the collaborative learning mechanism begins, all training participants, including both training data contributors and training infrastructure providers, should come to a consensus on the definition of the hyper-parameters for the ML model. During the model building process, each individual training participant should not be able to view the raw training data or infer the information of training data belonging to other contributors. After building the model, the trained ML model should be shared among all the data contributors.

In the privacy-preserving aspect, training data is opaque to any participants who are not the data owner and no one, except the owner, is able to inspect the original training data. However, malicious training data contributors can exploit and abuse such non-transparent training style to feed poisoned/mislabeled training data into the training data supply chains and implant backdoors into the ML model. Consequently, the malicious data contributors may influence and drift the final ML model's output to their own intended direction for their own benefit or to the detriment of legitimate data contributors. Once model users encounter erroneous outputs of the trained ML model at runtime, such privacy setting can obstruct the model debugging and forensic process from backtracking the responsible "bad" training data and analyzing the linkage to the corresponding data contributor(s), thus raising concerns regarding model accountability.

Recently, Shokri et al., "Privacy-Preserving Deep Learning," Proceedings of the $22^{nd}$ ACM CCS, 2015, have proposed a privacy preserving deep learning framework for collaborative training with differential privacy guarantee. Participants can train independently with their own dataset locally and selectively share subsets of their model parameters during training. Parameters can also be obfuscated via differential privacy to defeat privacy attacks. However, their approach lacks the capabilities of verifying legitimate data sources and tracking the provenance of training data. Thus, this approach is still vulnerable to data poisoning attacks launched by either training infrastructure providers or data contributors. Ohrimenko et al., "Obvious Multi-Party Machine Learning on Trusted Processors," USENX Security Symposium, 2016 proposed a mechanism to leverage Intel Software Guard Extensions (SGX) to enable multi-party collaborative training for different machine learning methods, including neural networks. Ohrimenko et al. focused on the design of data-oblivious machine learning algorithms, but did not cover the model accountability issue in the privacy-preserving setting. In addition, due to the performance and memory constraints of SGX enclaves, their approach is not applicable to train large-scale deep learning models.

To address the limitations of existing privacy-preserving training approaches, such as Shokri et al. and Ohrimenko et al., the illustrative embodiments provide a secure-trusted execution environment-based deep learning training system that achieves the goals of preserving training data privacy, denying poisoned data from illegitimate data sources, and generating accountable models, i.e. also referred to as a deep learning "model". With the mechanisms of the illustrative embodiments, participants are permitted to provision encrypted training data into the training infrastructure. A trusted execution environment (TEE), e.g., the Protected Execution Facility for IBM Power Systems, Secure Service Containers for IBM Z Systems, Intel Software Guard Extensions (SGX), ARM TrustZone, AMD Secure Memory Encryption and Secure Encrypted Virtualization, or the like, is employed on training computing devices to ensure the confidentiality and integrity of training data. To bridge the memory and performance gaps of the TEE, a partitioned deep learning pipeline training infrastructure is utilized in which the deep learning pipeline is partitioned into a FrontNet subnet model that executes within the secure TEE, and a BackNet subnet model that executes outside the TEE and can take advantage of various acceleration mechanisms. The mechanisms of the illustrative embodiments also enforce data authentication and verification within the TEE to deny training data from unregistered data channels, e.g., data injected by training infrastructure providers, which are not supposed to feed data into the training pipeline.

In addition, the mechanisms of the illustrative embodiments provide a fingerprint mechanism for all training data instances from legitimate channels to build accountable deep learning models. Mechanisms are provided to ensure that such fingerprints cannot be reconstructed to reveal the original training data, but can still assist debugging incorrect outputs at runtime and identify the influential (poisoned or mislabeled) training data and their corresponding contributors.

Thus, the illustrative embodiments, in addressing the confidentiality and integrity problems of delegated/collaborative training, provide a verifiable deep learning training service that leverages trusted execution environments on cloud infrastructures. Users only need to provision encrypted training data to the verifiable deep learning training service provider, which guarantees the confidentiality of their training data via the mechanisms of a trusted execution environment (TEE) and the authentication and verification mechanisms provided therein. Any poisoned or mislabeled training data that may attempt to be injected into the training of the deep learning pipeline (or machine learning (ML) model) is discarded by these authentication and verification mechanisms prior to being used to train the deep learning pipeline. This ensures the integrity of the trained deep learning pipelines (ML model). Moreover, any poised or mislabeled training data may be traced back to the source using the fingerprinting mechanisms of the illustrative embodiments, as described hereafter.

The illustrative embodiments partition deep learning pipelines, or ML models, comprising one or more models, into a FrontNet subnet model, or "FrontNet", and a BackNet subnet model, or "BackNet", based on the structure of the deep learning pipeline or ML models. In some illustrative embodiments, the FrontNet subnet model and BackNet subnet model may be deep neural network models, for example. Mathematically, in some illustrative embodiments, a deep neural network (DNN) can be defined as a function $F^*$ that maps the input x to the output y, i.e., $y=F^*(x; \theta)$, where $\theta$ stands for the parameters that are learned in the training phase when training the DNN. The function $F^*$ is composed of n (assuming the network has n layers) sub-functions $D_i$ where $i \in [1, n]$. $F_1$ maps the input $x_i$ to the output $y_i$ on Layer i. These sub-functions are connected in a chain. Thus, $y=F^*(x; \theta)=F_n F_{n-1} \ldots F_1(x)$. After partitioning the DNN at the m-th layer where $m \in [1, n]$, the function for the FrontNet subnet model can be represented as $\Phi: X \to IR$. X is the input space applicable for a specific deep neural network and IR is the output space for the intermediate representations (IRs). $IR=\Phi(x; \theta_\Phi)=F_m F_{m-1} \ldots F_1(x)$ and its output IR is the intermediate representation (intermediate feature maps) computed out of the FrontNet subnet model. The function $y^*$ for the BackNet subnet model is $\lambda(IR; \theta_\lambda)=F_n F_{n-1} \ldots F_{m+1}(IR)$, in which IR is the input to the BackNet subnet model from the FrontNet subnet model.

As defined above, the representation function for a FrontNet subnet model is $IR=\Phi(x; \theta_\Phi)$ and a BackNet is $y^*=\lambda(\Phi(x; \theta_\Phi); \theta_\lambda)$. The parameter $\theta$ of the original DNN is divided into $\theta_\Phi$ and $\theta_\lambda$ according to the network partition. The output shape of a FrontNet subnet model is compatible with the input shape of its corresponding BackNet subnet model. IR is delivered as an output for the FrontNet subnet model and is an input to the subsequent BackNet subnet model which continues the computation to get a result $y^*$. Given the same input x, it is expected that $y^*$ should be equivalent to y, which is the output of the original DNN before the partition.

In accordance with the illustrative embodiments, the training operation for training a deep learning pipeline, or machine learning (ML) model, is also split into FrontNet subnet model training and BackNet subnet model training. The FrontNet subnet model training is executed in an isolated trusted execution environment (TEE) with memory access control and encryption enforcement. The users only need to provision encrypted training data to the training service providers. Thus, no one other than the end users can inspect the content of the training data outside of the TEE. The processes running inside of the TEE authenticate the source of the training data, decrypt the encrypted training data, and verify its validity. Any poisoned training data will be discarded by checking the data authenticity, whereas the authentic and valid training data will be used to train the deep learning pipeline, or ML model. A stochastic gradient descent, for example, may be used for the deep learning training, and back-propagation gradients may be used to update the weights in the FrontNet subnet model and BackNet subnet model of the deep learning pipeline, e.g., the weights of the corresponding nodes in the neural networks. After reaching a desired accuracy of the deep learning pipeline or ML model, e.g., a minimization of the loss function or convergence of the training, both the FrontNet subnet model and BackNet subnet model are stored as the trained model and released back to the user.

With the protection of the training data access control mechanisms and training data encryption/decryption mechanisms of the TEE, all non-TEE accesses from privileged system software or other untrusted components of systems will be denied and any poisoned or mislabeled training data will be discarded and potentially traced back to its source using the fingerprinting mechanisms of the illustrative embodiments. Thus, the training processes and unencrypted original training data provided by the various training data sources for training the FrontNet subnet are kept within the perimeter of a specific TEE and are invisible to the external world. Furthermore, the TEE can attest to remote parties (i.e., the end users of the cloud training services) that the FrontNet subnet model is running in a secure environment hosted by a trusted hardware platform.

As noted above, in order to protect the contents of training data supplied by end users from being exposed on cloud servers, end users may encrypt the training data with their symmetric keys and upload the encrypted files to the verifiable deep learning training services of the illustrative embodiments. After finishing the remote attestation with the TEE executing on the verifiable deep learning training service computing device(s), end users can provision the symmetric keys to the TEE via a secure communication channel. The mechanisms executing within the TEE, after authenticating received training data, then decrypt the training data and pass the decrypted training data, potentially after data augmentation, to the FrontNet subnet model for training. The illustrative embodiments may leverage an authenticated encryption mechanism, such as the Galois Counter Mode (GCM) for example, or any of a variety of other authenticated encryption mechanisms, to achieve authenticated encryption. Thus, the illustrative embodiments can authenticate legitimate training data contributors and render service abusing attacks ineffective. For adversaries who are attempting to inject a backdoor into the training of the deep learning pipeline via poisoned or mislabeled training data, they would need to encrypt their training data with the proper symmetric keys from the legitimate training data contributors. Assuming that training data contributors' keys are not leaked, the illustrative embodiments can discard this illegitimate training data that fails the authentication and/or integrity check and prevent the introduction of poisoned or mislabeled training data into the training processes of the deep learning pipeline.

It should be appreciated that the above process may be performed using a plurality of training datasets from a plurality of training data contributors in a collaborative manner to perform collaborative training of the FrontNet and BackNet subnet models, where the training of the FrontNet subnet model is secured within the TEE while the BackNet subnet model only receives intermediate representations (IRs) that are not able to be used to recreate the original training data. As such, the encryption keys and training data for each training data contributor or training dataset source are maintained secure within the TEE and are not accessible by others outside the TEE, i.e. the original training data is only accessible to the data owners and not to other parties involved in the collaborative training. Hence, a collaborative training is achieved without exposing each training data contributor's original training data.

While the protections afforded by the mechanisms of the illustrative embodiments within the TEE protect the training process of a deep learning pipeline, or ML model, from illegitimate training data from unregistered sources, these mechanisms may not be able to prevent poisoned or mislabeled data from legitimate, or registered, sources which may be malicious or negligent. To address these issues, the illustrative embodiments provide a fingerprint mechanism that records evidential features for each training data instance, where these evidential features, in some illustrative embodiments, include a fingerprint of a specific training instance, a class label of a training data instance, an identifier of the data source, and a hash digest of the training data instance. The fingerprint mechanism is able to provide a tracing capability to trace not only the source of potentially poisoned or mislabeled training data, but also identify the particular training dataset in which the poisoned or mislabeled training data is present.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the illustrative embodiments provide mechanisms specifically directed to the training of a deep learning pipeline, also referred to as a deep learning model or machine learning (ML) model, that executes in one or more data processing systems or computing devices. More particularly, the illustrative embodiments are directed to providing verifiable deep learning training services for collaborative training of such deep learning pipelines, deep learning models, or ML models, using training data from a plurality of training data sources while maintaining the confidentiality of the training data and preventing malicious or negligent injection of poisoned or mislabeled training data into the training process. Furthermore, should a legitimate training data contributor maliciously or negligently introduce such poised or mislabeled training data into the training process, such instances may be identified and traced using a fingerprinting mechanism.

FIG. 1 is an example diagram illustrating a training stage workflow and interaction of operational components of a verifiable deep learning training cloud service in accordance with one illustrative embodiment. In the depiction in FIG. 1, the client side operations are performed on collaborative participant computing devices or data processing systems 110, 120, while the server side operations are performed on one or more server computing devices or data processing systems 130 implementing the verifiable deep learning training service infrastructure of the illustrative embodiments, which includes both logical structures and hardware structures for execution and storage of the logical structures, that together provide the deep learning training service infrastructure. Interaction between the client side and the server side is facilitated by one or more data networks 102. As discussed above, the interaction between the client side and server side is specifically for the collaborative training of a deep learning pipeline, deep learning model, or machine learning (ML) model (referred to hereafter as the "deep learning model") comprising one or more neural networks, using training datasets provided by a plurality of training dataset contributors, sources or providers, referred to herein as "training data contributors." It should be appreciated that when the present description refers to the training data contributors performing particular operations, this involves the use of client side computing devices or data processing systems 110, 120 to perform the operations attributed to the training data contributors.

As shown in FIG. 1, before training of the deep learning model begins, training data contributors prepare their training data locally, via computing devices 110, 120 in advance. This preparation includes encrypting each training dataset 112, 122 with their own symmetric key. After encryption, the training data contributors can upload their encrypted training datasets 114, 124 to the server(s) appointed by the verifiable deep learning training service infrastructure provider, e.g., server 130 in the depicted example. The verifiable deep learning training service 140 may, in some illustrative embodiments, randomly select encrypted training data from different users to build minibatches for training the deep learning model 150.

The verifiable deep learning training service 140 launches a trusted execution environment (TEE) 142, such as a SGX enclave or the like, on a server 130 and loads the training code into it. In order to establish the trust between training data contributors 110, 120 and the launched TEE 142, a security module 144 of the TEE 142 performs a remote attestation procedure. The attestation process can prove to the training data contributors 110, 120 that they are communicating with a secure TEE 142 established by a trusted processor and the code running within the TEE 142 is certified. Each training data contributor 110, 120 may establish a key provisioning server locally (not shown). After the remote attestation, the key provisioning servers run by the different training data contributors 110, 120 can create secure communication channels, e.g., secure transport layer security (TLS) communication channels, directly to the TEE 142 and provision their symmetric keys, which are used by the security module 144 for authenticating and decrypting the training data, to the TEE 142.

With security keys provisioned from training data contributors 110, 120, the security module 144 of the verifiable deep learning training service 140 authenticates the data sources 110, 120 of the encrypted. For example, in one illustrative embodiment, a Galois Counter Mode (GCM) may be implemented to achieve authenticated encryption. The training data contributors 110, 120 encrypt their training datasets, or "mini-batches," and then produce authentication tags. Within the TEE 142, authentication logic of the security module 144 verifies the authenticity and integrity of the encrypted training datasets with the corresponding provisioned symmetric keys. The keys from different training data contributors 110, 120 are securely stored in the TEE 142 and not leaked to malicious adversaries. If some training datasets, or mini-batches, fail the integrity check, this indicates that they are corrupted. The training dataset may be compromised during the uploading process or may come from illegitimate data channels. For example, the verifiable deep learning training service infrastructure provider should not contribute training data to train the deep learning model 150. If the training infrastructures are penetrated by adversaries or there exist some malicious system administrators, these external and internal adversaries may want to influence the final trained deep learning model by injecting poisoned data samples into the training pipeline. With the mechanisms of the illustrative embodiments, such injected training data from unregistered data channels will be discarded by the security module 144 due to their failure to pass authentication and integrity checks. After verifying the authenticity and integrity of the training data via the security module 144, the training data may be decrypted, optionally augmented by the data augmentation module 146, and passed into the training pipeline.

To build a robust trained deep learning model, data augmentation, via the data augmentation module 146, may be used as a pre-processing operation to diversify the training data for deep learning training. Because training data contributors 110, 120 provision encrypted training data, data augmentation is only performed within the TEE 142 after the received training data has been authenticated, its integrity has been verified, by the security module 144 and it has been decrypted by decryption mechanisms of the security module 144. Any type of known or later developed data augmentation techniques may be used by the data augmentation module 146 to enhance the training datasets, or mini-batches, received from the various training data contributors 110, 120. For example, in the case where the training dataset comprises data corresponding to images which are to be classified into one of a plurality of classes by the deep learning model 150, various types of image transformation techniques may be employed by the data augmentation module 146 to perform data augmentation, such as random rotation, flipping, and distortion based data augmentation that operate to diversify the training dataset. This may be done with regard to each training dataset, or mini-batch of training data, received from the various data contributors 110, 120.

As mentioned previously, existing approaches to providing collaborative training of deep learning models or machine learning models are restricted due to performance and memory constraints. With these mechanisms, computations cannot benefit from hardware and compilation deep learning-accelerated features, such as graphics processing units (GPUs) or floating arithmetic optimization. Moreover, the size limitation for the protected physical memory is relatively small and, while memory paging support may be used to extend the memory via data swapping, swapping on encrypted memory may significantly affect the performance.

Due to these limitations, the verifiable deep learning training service 140 of the illustrative embodiments partitions the to-be-trained deep learning model 150, e.g., the machine learning model or deep neural network (DNN) that is to be trained, into the FrontNet neural network model 152, or FrontNet subnet model, and the BackNet neural network model 154, or BackNet subnet model. The FrontNet subnet model 152 is maintained within the TEE 142 and thus, is secured by the TEE 142 from outside access. The BackNet subnet model 154 need not be protected through execution within the TEE 142. However, in some illustrative embodiments, the BackNet subnet model 154 may also be executed within the TEE 142. In the depicted example, the BackNet subnet model 154 is not executed within the TEE 142 due to performance constraints. However, if these performance constraints are lifted, or relaxed, it is possible that the training of the BackNet subnet model 154 may also be protected in a similar manner to that of the FrontNet subnet model 152 via the TEE 142.

Thus, in some illustrative embodiments, the whole deep learning pipeline or model 150, machine learning model, or deep neural network that is being trained, may be executed within the TEE 142. Again, in the depicted example embodiments, the partitioning of the deep learning pipeline 150 is performed due to the memory size limitation of the TEE 142, additional performance overhead of code execution in the TEE 142, and there being no additional privacy benefit by enclosing more layers of the deep learning pipeline or model 150 within the TEE 142 beyond the partition point, which may be determined through manual selection of the partition point or through an automated mechanism. In some illustrative embodiments, the FrontNet subnet model 152 will comprise a first portion of layers of the deep learning model 150 while the BackNet subnet model 154 will comprise a second portion that is the remaining layers, where the number of layers in the first and second portions are determined by subject matter experts based on a balancing of performance and accuracy in the operation of the deep learning model 150. Moreover, by executing the BackNet subnet model 154 outside the TEE 142 in the example embodiments, the resulting framework allows for leveraging deep learning accelerated hardware, e.g., GPUs, to boost the deep learning training performance. This configuration of FrontNet subnet model 152 and BackNet subnet model 154 can reduce the computation costs on the FrontNet training initially, and completely eliminate any FrontNet training costs while the BackNet subnet model 154 is being refined.

The process of training the deep learning model 150 comprises three phases referred to as the feedforward phase, backpropagation phase, and weight updates phase. In the feedforward phase, each training dataset, or mini-batch, passes through the deep learning model 150 and the loss function is calculated at the output layer of the BackNet subnet model 154 of the deep learning model 150. The delta values generated by the loss function are then backpropagated from the output layer as part of the backpropagation phase. Each neuron or node of the deep learning model 150 has an associated error value that reflects its contribution to the output. The chain rule, which indicates how to differentiate composite functions, is used to iteratively compute gradients for each layer and update the neuron or node weights accordingly as part of the weight updates phase.

For the partitioned deep learning model 150 of the illustrative embodiments, computed intermediate results (IRs) are communicated between in-TEE and out-of-TEE layers. That is, in the feedforward phase, intermediate results (IRs) generated by the last layer within the FrontNet subnet model 152 are provided to the subsequent layers located out of the TEE 142, e.g., the "input layer" or first layer of the BackNet subnet model 154. In the backpropagation phase, the delta values are delivered back into the TEE 142. The gradient computation and weight updates can be performed independently with no layer dependency.

This process is repeated until a change in the loss function meets predetermined threshold criteria, i.e. the loss is minimized to a predetermined level. Once the threshold criteria are met, the deep learning model 150, comprising the FrontNet subnet model 152 and BackNet subnet model 154, are considered trained. After the training ends, the trained deep learning model 150 is shared or released to all training data contributors 110, 120 with its FrontNet encrypted respectively with symmetric keys provisioned by the different training data contributors 110, 120.

From a security perspective, the IRs delivered out of the TEE 142 in the feedforward phase represent the features extracted by layers of the FrontNet subnet model 152 executing within the TEE 142. By progressing from shallow layers to deep layers, the IR output can present more abstract and high-level representations towards the final output, e.g., classification result. In addition, the weights of the deep learning model 150 change dynamically during training iterations. By always keeping the weights of the layers trained within the secure TEE 142 in confidence, the mechanisms of the illustrative embodiments are resilient to input reconstruction attacks. By including more layers in the TEE 142, better privacy protection can be achieved with more performance overhead. As noted above, the optimal partitioning point for partitioning a specific deep learning model 150 architecture, taking into account the tradeoff between privacy protection and performance, may be made using a manual process or an automated tool. Moreover, in some illustrative embodiments, based on privacy requirements of different training data contributors 110, 120, and sensitive levels of training data, the training data contributors 110, 120 may negotiate and determine a customized partitioning point as a special hyper-parameter prior to training which may be provided to the verifiable deep learning training service 140 and may be used when instantiating the deep learning model 150 for training.

Thus, during the training phase, training data contributors 110, 120 may negotiate a partitioning point of the deep learning model 150 and will encrypt their training datasets 112, 122, or mini-batches, prior to transmission to the verifiable deep learning training service 140. The training data contributors 110, 120 perform remote attestation with the TEE 142 and establish secure communication connections with the TEE 142. The training data contributors 110, 120 then upload the encrypted training datasets 114, 124, or mini-batches, to the verifiable deep learning training service 140. The security module 144 executing in the TEE 142 of the verifiable deep learning training service 140 performs data authentication and integrity checks on the received encrypted training datasets 114, 124 and discards any training datasets, or mini-batches, that do not pass one or more of the checks. For those training datasets that pass both authentication and integrity checks, the data is decrypted by the security module 144 and optionally augmented by the data augmentation module 146 within the TEE 142. The resulting decrypted training dataset is then used to train the FrontNet subnet model 152 and BackNet subnet model 154 (based on the IRs generated by the FrontNet subnet model 152) of the deep learning model 150, as discussed above. During the training, only IRs are provided between the FrontNet subnet model 152 executing within the TEE 142 and the BackNet subnet model 154 executing outside the TEE 142, potentially making use of deep learning acceleration mechanisms (not shown) to improve the performance of the BackNet subnet model 154. Thus, at no point in the training process is the unencrypted training datasets, or mini-batches, provided by the training data contributors 110, 120 accessible outside the TEE 142, other than the original training data being accessible locally by the data owners themselves at their client side computing devices.

Figure 2:
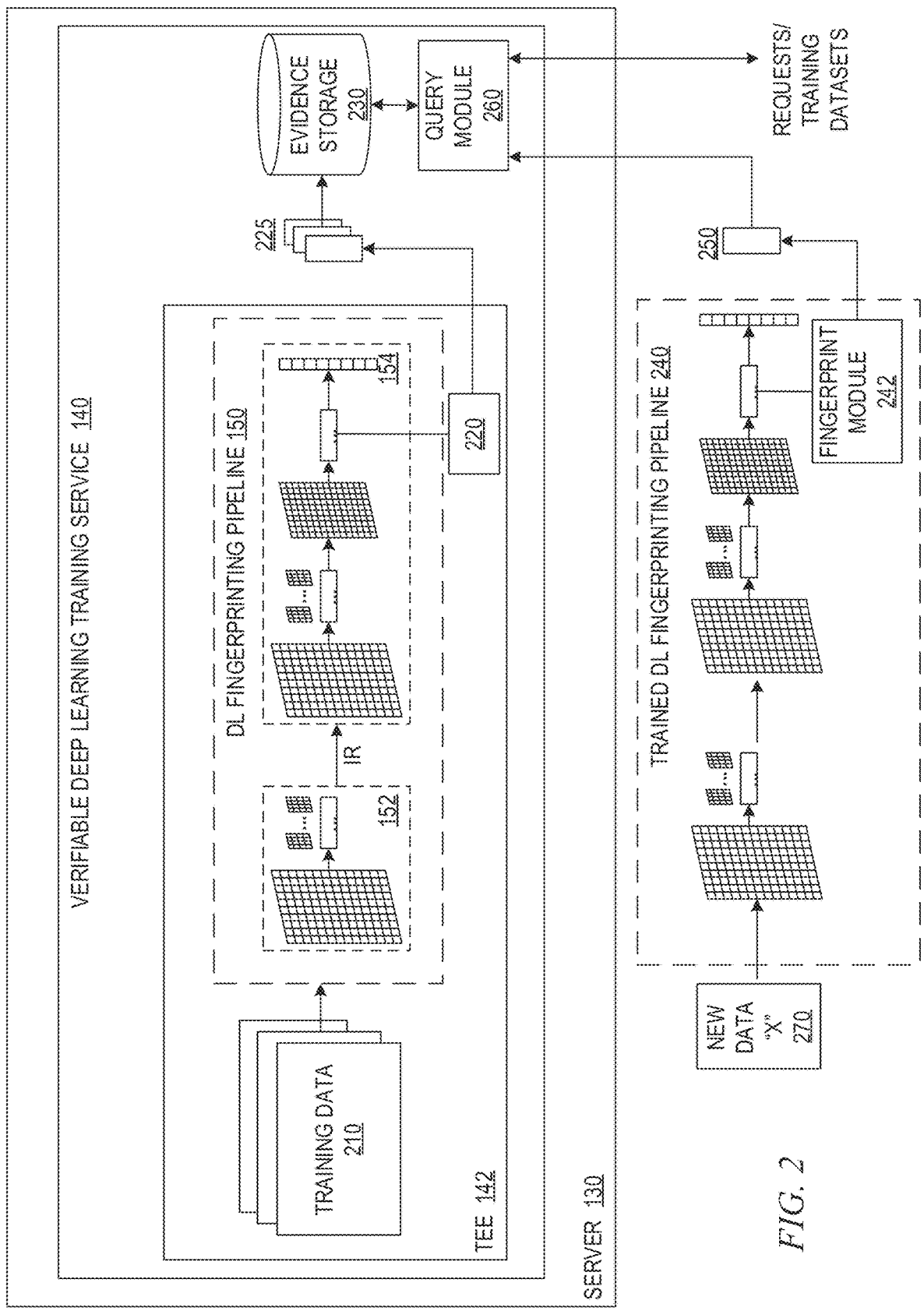
FIG. 2 is an example diagram illustrating a fingerprinting stage and query stage workflow and interaction of operational components of a verifiable deep learning training cloud service in accordance with one illustrative embodiment.

FIG. 2 is an example diagram illustrating a fingerprinting stage and query stage workflow and interaction of operational components of a verifiable deep learning training service 140 in accordance with one illustrative embodiment. As described above with regard to FIG. 1, during the training stage data sources, e.g., training data contributors 110, 120, may be verified with enforced data authentication by the security module 144 and any illegitimate training data from unregistered sources may be discarded. However, such enforcement cannot prevent poisoned or mislabeled data from legitimate (but malicious or negligent) training data contributors. Moreover, since training data contributors submit encrypted training datasets, and the data can only be decrypted within the TEE 142, these protections tend to be contrary to the goal of providing an accountable, or verifiable, deep learning training.

To address the accountability issue, the illustrative embodiments provide a fingerprinting mechanism 220, 242 to discover the poisoned and/or mislabeled training datasets 210 that lead to an erroneous output during runtime operation, e.g., a runtime misclassification of input data X by the trained deep learning model 240. Instead of retaining the original training data for runtime inspection, the fingerprinting mechanism 220, 242 of the illustrative embodiments records evidence 225 for each training data instances 210, which may then be used to trace the data source and training dataset leading to the erroneous training of the deep learning model 150. In some illustrative embodiments, the recorded evidence is a 4-tuple evidence set $\Omega=[F, Y, S, H]$, where F is a fingerprint of a specific training instance, Y is the class label of the training data instance used to train the deep learning model, S is the data source identifier, and H is the computed hash digest of this training data instance. The mechanisms of the illustrative embodiments leverage the TEE's guarantee of confidentiality and integrity of the evidence generation process from being tampered with by the training infrastructure provider. As the evidence generation is a one-time effort, unlike feedforward-backpropagation iterations performed during training, the whole trained deep learning model 150 may be included in the TEE 142. In a 4-tuple evidence $\Omega$, the functionalities of [Y, S, H] are to reduce the search space to a specified class label, identify responsible data contributors, and verify training data integrity. The fingerprint F, as described hereafter, is the normalized feature embedding of the penultimate layer (the layer before the softmax layer) for the particular training data instance.

The prediction capability of a deep learning model 150 is determined by the training data it observes in the training stage. Once users of the trained deep learning model 240 encounter incorrect outputs at runtime, the fingerprinting mechanism 220, 242 of the illustrative embodiments is used to identify the subgroup of training data instances 210 that lead to the erroneous behavior. The causality relation is modeled by measuring the distance of embeddings in the feature space between the training data 210 and the testing data, e.g., new data X 270. An approach similar to that described in Krizhevsky et al., "ImageNet Classification with Deep Convolutional Neural Networks," Advances in Neural Information Processing Systems, 2012. The proximity of the two feature embeddings of a pair of training 210 and testing inputs 270 demonstrates that they activate a similar subset of features extracted in the deep learning model 150.

More specifically, for each training data instances 210, the fingerprint module 220 of the illustrative embodiments retrieves the normalized feature embedding out of the penultimate layer (the layer before the softmax layer) as its fingerprint F. The embeddings at this layer contain the most important features extracted through all previous layers in the deep learning model 150. The L2 distance between the fingerprints is used as the distance function to measure the similarity of two embeddings in the feature space.

Once the deep learning model 150 is trained and released to the training data contributors, the trained deep learning model 240 may operate on new data X 270 to perform a trained operation of the deep learning model 240, e.g., a classification operation or the like, which generates an output label, e.g., classifying a particular image input as a particular class of image. When the label of a new observed data instance 270 is generated by the processing of the data instance 270 through the trained deep learning model 240, the generated label Y is obtained as well as its fingerprint F by the fingerprint module 242 associated with the trained deep learning model 240. If a user considers the generated label to be incorrect, the user can upload the fingerprint and output Y 250 to a query module 260 of the verifiable deep learning training service 140 and check which instances in the training data 210 caused the problem. That is, the L2 distance to all training data fingerprints F in category Y, as stored in the evidence storage 230, is calculated and the closest training instances are identified. The tested instance, i.e. the new observed data instance 270, may be regarded as a cluster center and the query module 260 finds the closest instances in the training data 210 which belong to the same subgroup in category Y.

In some illustrative embodiments, the fingerprint module 220 of the verifiable deep learning training service 140 is implemented as a plug-in module. The fingerprint 220 module can be extended to support other causality analysis mechanism to measure the training data's influence on runtime operation results, e.g., classification predictions. Fingerprints may be modified to accommodate specific requirements for these other causality analysis mechanisms. For example, if an influence function, such as described in Koh et al., "Understanding Black-Box Predictions via Influence Functions," Proceedings of the $34^{th}$ International Conference on Machine Learning, 2017, is utilized as the causality analysis mechanism in lieu of deep representations in the feature space, the influence $I_{up,loss}$ of upweighting training sample z on the loss of a testing sample $z_{test}$ will need to be calculated based on equation (1) in which L is the loss function, H is the Hessian of the empirical risk, and $\theta$ represents the model parameters:

$$I_{up,loss}(z, z_{test}) = \nabla_\theta L(z_{test}, \theta)^T H_\theta^{-1} \nabla_\theta L(z, \theta) \quad (1)$$

In this situation, the equation (1) may be divided into two parts. On the collaborative training side, the illustrative embodiments may pre-compute the product of the inverse Hessian $H_\theta^{-1}$ (which requires all training data points) and $\nabla_\theta L(z, \theta)$, to serve as the fingerprint F for each z. At prediction time, the mechanisms of the illustrative embodiments can compute $\nabla_\theta L(z_{test}, \theta)$ and query the server to discover the most influential training data points.

It should be appreciated that the training infrastructure providers cannot reconstruct training dataset inputs from the generated evidence. The reason is that they cannot get access to the complete trained deep learning model 240 as the front layers are trained in the isolated TEE 142 and released to the training data contributors in an encrypted manner. Thus, the infrastructure providers cannot exploit input reconstruction techniques which require white/black-box access to the trained models to approximate the training data. Furthermore, training data contributors cannot recover training data belonging to other contributors because they only have access to the trained deep learning model, but do not have access to any evidence data.

The evidence, e.g., the 4-tuple evidence $\Omega$, of all training data is stored in an evidence storage 230 of the verifiable deep learning training service 140 for use in processing queries after releasing the trained deep learning model 240. As part of the query stage of operation, once a user discovers erroneous outputs from the trained deep learning model, the user may submit the problematic input 270 through the trained deep learning model 240 to obtain the output, e.g., class label Y, and also retrieve its fingerprint F, via a fingerprint module 242 at the penultimate layer. The user can submit a query to the query module 260 of the verifiable deep learning training service 140 which searches the evidence storage 230 to find fingerprints F with the same class label Y. Based on the data sources S of the training data candidates, a request may be sent to the corresponding training data contributors to disclose and submit the original data of the suspicious training datasets. The query module 260 may verify the hash digests H of these training datasets to ensure that they are exactly the same data as used in training. In the following forensic and debugging analysis, the root cause for the incorrect output can be identified by searching fingerprints and identifying the subset of poisoned training data which causes the misclassification at inference time. Thus, the query module 260 mechanisms reduce the data exposure to a minimum level by only soliciting a small subset of suspicious training data on demand to achieve accountability.

Figure 3A:
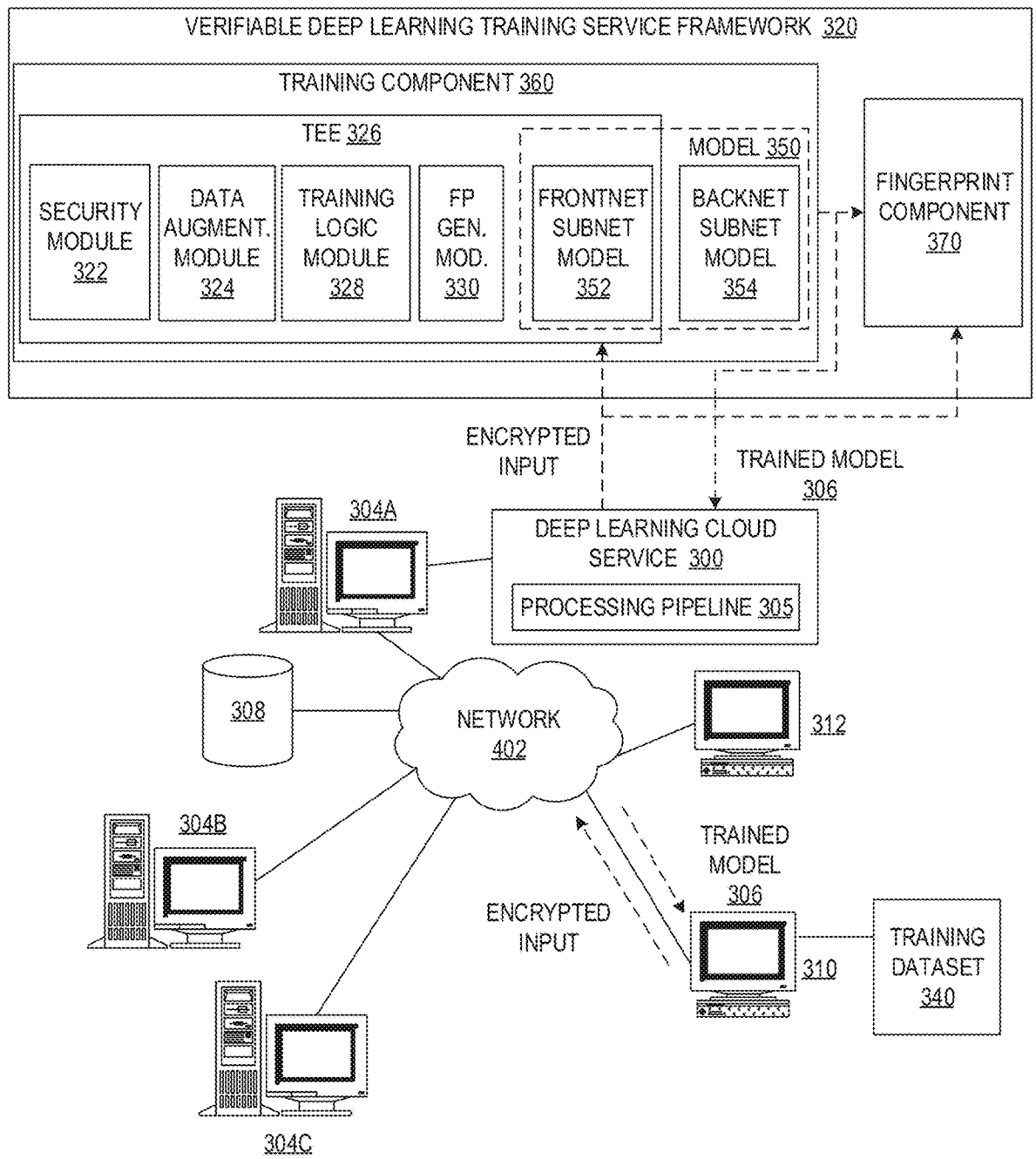
FIG. 3A depicts a pictorial representation of an example distributed data processing system in which aspects of the illustrative embodiments may be implemented, with emphasis on the training component of the verifiable deep learning training service framework.
Figure 3B:
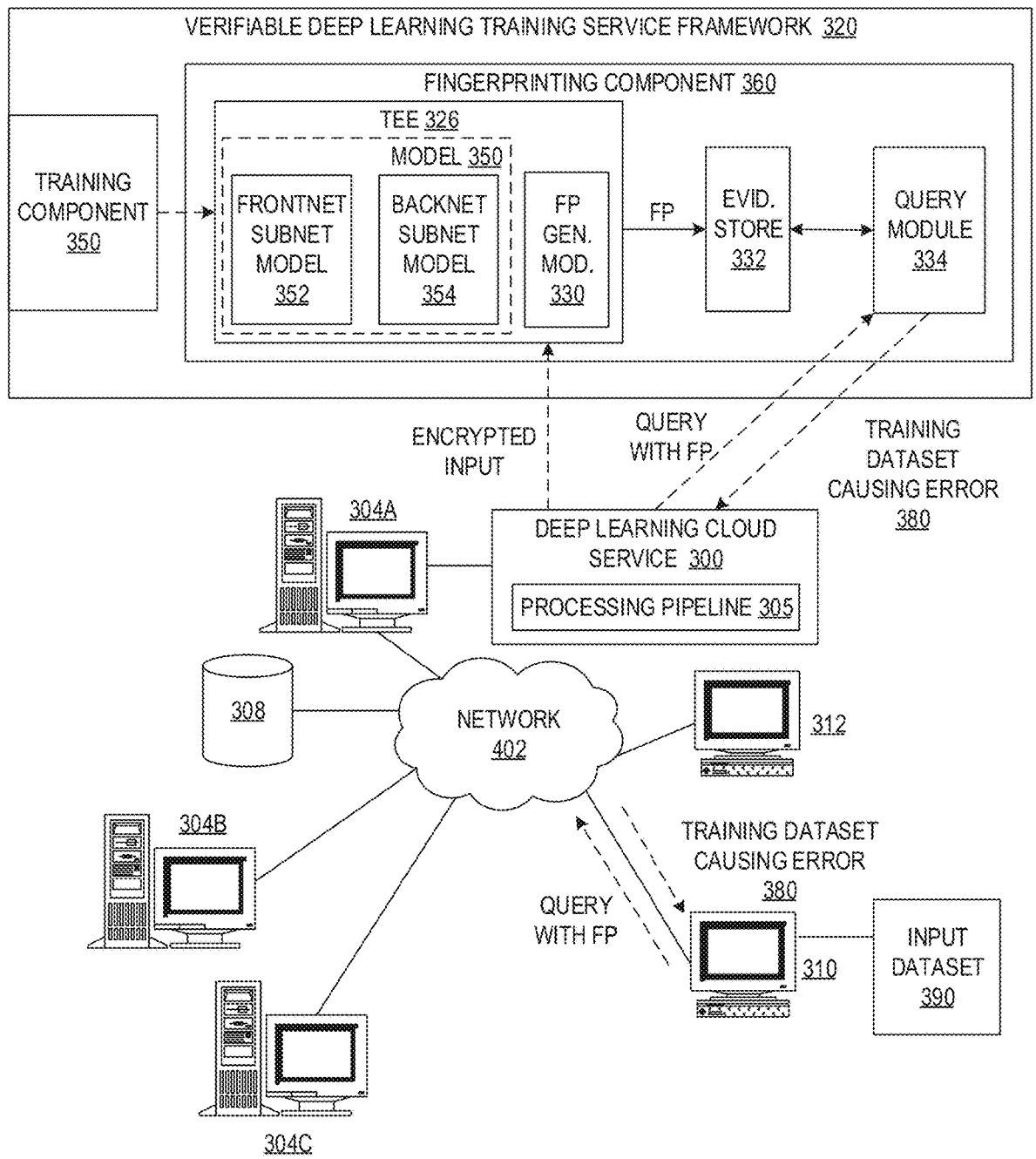
FIG. 3B depicts a pictorial representation of an example distributed data processing system in which aspects of the illustrative embodiments may be implemented, with emphasis on the fingerprint component of the verifiable deep learning training service framework.
Figure 4:
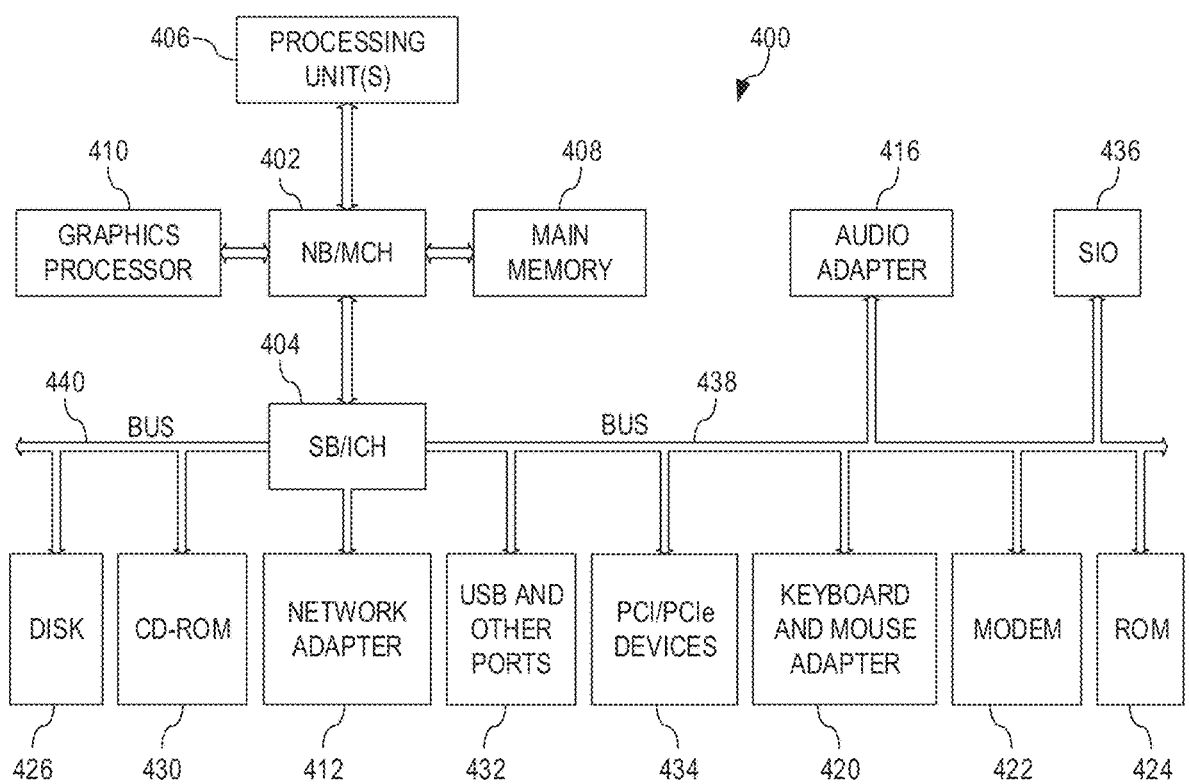
FIG. 4 is a block diagram of just one example data processing system in which aspects of the illustrative embodiments may be implemented.

As is apparent from the above description, the present invention provides a computer tool for improving the privacy of input data to a deep learning system. Thus, the illustrative embodiments may be utilized in many different types of data processing environments. In order to provide a context for the description of the specific elements and functionality of the illustrative embodiments, FIGS. 3A-3B and 4 are provided hereafter as example environments in which aspects of the illustrative embodiments may be implemented. It should be appreciated that FIGS. 3A-3B and 4 are only examples and are not intended to assert or imply any limitation with regard to the environments in which aspects or embodiments of the present invention may be implemented. Many modifications to the depicted environments may be made without departing from the spirit and scope of the present invention.

FIG. 3A depicts a pictorial representation of an example distributed data processing system in which aspects of the illustrative embodiments may be implemented, with emphasis on the training component 350 of the verifiable deep learning training service framework 320. FIG. 3B depicts a pictorial representation of an example distributed data processing system in which aspects of the illustrative embodiments may be implemented, with emphasis on the fingerprint component 360 of the verifiable deep learning training service framework 320. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, satellite communication links, fiber optic cables, or the like.

In the depicted example, servers 304A-304C are connected to network 302 along with storage unit 308. In addition, clients 310 and 312 are also connected to network 302. These clients 310 and 312 may be, for example, personal computers, network computers, or the like. In the depicted example, servers 304A-304C provide data, such as boot files, operating system images, and applications to the clients 310-312. Clients 310-312 are clients to a cloud computing system comprising server 304A, and possibly one or more of the other server computing devices 304B-304C, in the depicted example. Distributed data processing system 300 may include additional servers, clients, and other computing, data storage, and communication devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3A, one or more of the computing devices, e.g., server 304A, may be specifically configured to implement a deep learning cloud service 300 which further implements a verifiable deep learning training service framework 320, in accordance with one illustrative embodiment. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 304A, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates enhanced data and model privacy when using a deep learning cloud service by providing a trusted execution environment (TEE) implementation and training of a FrontNet subnet model of a deep learning model, e.g., deep neural network (DNN), within the trusted execution environment on decrypted training data while providing training of a BackNet subnet model using intermediate representations (IRs) generated by the FrontNet subnet model without exposing the decrypted training data outside the TEE.

As shown in FIG. 3A, one or more of the servers 304A-304C are configured to implement the deep learning cloud service 300 and verifiable deep learning training service framework 320 (hereafter referred to as the "framework" 320). While FIG. 3A shows elements 300 and 320 being associated with a single server, i.e. server 304A, it should be appreciated that a plurality of servers, e.g., 304A-304C, may together constitute a cloud computing system and be configured to provide the deep learning cloud service 300 implementing the framework 320 such that the mechanisms of the deep learning cloud service 300, including the framework 320 or portions thereof, and the processing pipeline(s) 305 or portions thereof, may be distributed across multiple server computing devices 304A-304C. In some illustrative embodiments, multiple instances of the deep learning cloud service 300, pipeline(s) 305, and framework 320 may be provided on multiple different servers 304A-304C of the cloud computing system. The deep learning cloud service 300 may provide any deep learning or AI based functionality of a deep learning system, an overview of which, and examples of which, are provided hereafter.

In some illustrative embodiments, the deep learning cloud service 300 may implement a cognitive computing system, or cognitive system. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, image analysis and classification logic, electronic medical record analysis logic, etc., for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, image analysis and classification operations, intelligent search algorithms such as Internet web page searches, for example, medical diagnostic and treatment recommendations and other types of recommendation generation, e.g., items of interest to a particular user, potential new contact recommendations, or the like.

IBM Watson is an example of one such cognitive system which can process human readable language and identify inferences between text passages with human-like high accuracy at speeds far faster than human beings and on a larger scale. In general, such cognitive systems are able to perform the following functions: navigate the complexities of human language and understanding; Ingest and process vast amounts of structured and unstructured data; generate and evaluate hypothesis; weigh and evaluate responses that are based only on relevant evidence; provide situation-specific advice, insights, and guidance; improve knowledge and learn with each iteration and interaction through machine learning processes; enable decision making at the point of impact (contextual guidance); scale in proportion to the task; Extend and magnify human expertise and cognition; identify resonating, human-like attributes and traits from natural language; deduce various language specific or agnostic attributes from natural language; high degree of relevant recollection from data points (images, text, voice) (memorization and recall); predict and sense with situational awareness that mimic human cognition based on experiences; and answer questions based on natural language and specific evidence.

In one illustrative embodiment, a cognitive system, which may be implemented as a deep learning cloud service 300, provides mechanisms for answering questions or processing requests from client computing devices, such as client computing device 310, via one or more processing pipelines 305. It should be appreciated that while a single pipeline 305 is shown in FIG. 3A, the present invention is not limited to such, and a plurality of processing pipelines may be provided. In such embodiments, the processing pipelines may be separately configured to apply different processing to inputs, operate on different domains of content from one or more different corpora of information from various sources, such as network data storage 308, be configured with different analysis or reasoning algorithms, also referred to as annotators, and the like. The pipeline 305 may process questions/requests that are posed in either natural language or as structured queries/requests in accordance with the desired implementation.

The pipeline 305 is an artificial intelligence application executing on data processing hardware that answers questions pertaining to a given subject-matter domain presented in natural language or processes requests to perform a cognitive operation on input data which may be presented in natural language or as a structured request/query. The pipeline 305 receives inputs from various sources including input over a network, a corpus of electronic documents or other data, data from a content creator, information from one or more content users, and other such inputs from other possible sources of input. Data storage devices, such as data storage 308, for example, store the corpus or corpora of data. A content creator creates content in a document for use as part of a corpus or corpora of data with the pipeline 305. The document may include any file, text, article, or source of data for use in the cognitive system, i.e. the cognitive cloud service 300. For example, a pipeline 305 accesses a body of knowledge about the domain, or subject matter area, e.g., financial domain, medical domain, legal domain, image analysis domain, etc., where the body of knowledge (knowledgebase) can be organized in a variety of configurations, e.g., a structured repository of domain-specific information, such as ontologies, or unstructured data related to the domain, or a collection of natural language documents about the domain.

In operation, the pipeline 305 receives an input question/request, parses the question/request to extract the major features of the question/request, uses the extracted features to formulate queries, and then applies those queries to the corpus of data. Based on the application of the queries to the corpus of data, the pipeline 305 generates a set of hypotheses, or candidate answers/results to the input question/ request, by looking across the corpus of data for portions of the corpus of data that have some potential for containing a valuable response to the input question/request. The pipeline 305 performs deep analysis on the input question/request and the portions of the corpus of data found during the application of the queries using a variety of reasoning algorithms. There may be hundreds or even thousands of reasoning algorithms applied, each of which performs different analysis, e.g., comparisons, natural language analysis, lexical analysis, image analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity. Still further, some reasoning algorithms may perform image analysis so as to classify images into one of a plurality of classes indicating the nature of the image.

The scores obtained from the various reasoning algorithms indicate the extent to which the potential response is inferred by the input question/request based on the specific area of focus of that reasoning algorithm. Each resulting score is then weighted against a statistical model. The statistical model captures how well the reasoning algorithm performed at establishing the inference between two similar inputs for a particular domain during the training period of the pipeline 305. The statistical model is used to summarize a level of confidence that the pipeline 305 has regarding the evidence that the potential response, i.e. candidate answer/ result, is inferred by the question/request. This process is repeated for each of the candidate answers/results until the pipeline 305 identifies candidate answers/results that surface as being significantly stronger than others and thus, generates a final answer/result, or ranked set of answers/results, for the input question/request.

As shown in FIG. 3A, the deep learning cloud service 300 and its corresponding processing pipeline(s) 305 implement a verifiable deep learning training service framework 320, or simply framework 320 hereafter. The framework 320 may be invoked to train a deep learning model, or deep neural network (DNN), 350 that may be used by the pipeline 305 to perform classification operations for processing an input request and/or data retrieved from a corpus, for example. The trained deep learning model, or DNN, 350 may be invoked by one or more of the reasoning algorithms of the processing pipeline 305 when performing its operations for reasoning over the input question/request and/or processing input data associated with the input question/request. For example, in some illustrative embodiments, the framework 320 may be invoked to assist with training the deep learning model to properly classify input data into one of a plurality of predetermined classes using a deep learning neural network (DNN) model, for example. The resulting trained deep learning model 306 generated by the framework 320 may be used during runtime processing of input requests to generate results, e.g., a vector output with probability values associated with each of the predetermined classes to thereby identify a classification of the input data, or simply the final classification itself, which may be provided back to the processing pipeline 305 for use in performing other deep learning operations, examples of which have been noted above.

As shown in FIG. 3A, the framework 320 comprises a training component 360 including a trusted execution environment (TEE) 326 implementing a security module 322 a data augmentation module 324, training logic module 328, and an automated fingerprint generation module 330. As shown in FIG. 3B, the framework 320 further comprises an evidence storage 332 and a query module 334 outside the TEE 326 as part of a fingerprinting component 370. The security module 322 provides the logic for performing authentication, attestation, and exchange of security keys with client computing devices 310, such as by way of establishing a Transport Layer Security (TLS) connection or other secure communication connection between the server 304A and the client computing device 310. Data augmentation module 324 is optional and may perform any known or later developed data augmentation operation on training data selected for training the deep learning model 350 (FrontNet subnet model 352 and BackNet subnet model 354), such as image rotation, image inversion, distortion, and the like. The training logic module 328 provides the logic for controlling and monitoring the training of the deep learning model 350 and may be configured with parameters for such control and monitoring. In general, operations associated with training the deep learning model 350 that are not specifically attributed to other depicted elements may be performed by the training logic module 328.

The automated fingerprint generation module 330 performs operations for generating fingerprints and evidence data for the training dataset instances used to train the deep learning model 350 which is then stored in the evidence storage 332 for later processing of queries by the query module 334. The operations of the security module 322, data augmentation module 324, and training logic module 328 are described in FIG. 1 above. The operations of the automated fingerprint generation module 330, evidence storage 332, and query module 334 are described in FIG. 2 above. It should be appreciated that the client computing devices 310, 312 from which training data is received, in some illustrative embodiments, may themselves be servers or other types of computing devices used at an organizational level of operation, rather than individual client computers associated with individual persons.

Within the TEE 326, encrypted input training data from a plurality of training data contributors, e.g., computing devices 310, 312, is authenticated and the integrity verified by the security module 322 and then, assuming all checks are passed, decrypted by the security module 322 to provide training data 340 to the FrontNet subnet model 352 of the deep learning model 350. The training data 340 may comprise augmented data in the training data 340 that is generated by the data augmentation module 324 if desired for the particular implementation. A BackNet subnet model 354 of the deep learning model 350 may be provided in the framework 320 and instantiated outside the TEE 326. The training logic module 328 orchestrates, controls, and monitors the training of the deep learning model 350 but does not have access to the decrypted training data within the TEE 326. The training phase processing, such as described above with regard to FIG. 1, is performed within the TEE 326 with regard to the FrontNet subnet model 352 and outside the TEE 326 with regard to the BackNet subnet model 354. The training logic module 328 may monitor the training from outside the TEE 326 and determine when training has been completed by looking at the loss function values generated by the BackNet subnet model 354.

The training logic module 328 may further initiate release of the trained deep learning model 306 to the training data contributors once the training has been determined to be complete. Again, in releasing the trained deep learning model 306, however, the FrontNet subnet model 352 may be released in an encrypted form, encrypted using the particular symmetric key associated with the particular training data contributor to which the trained model 306 is being released, while the BackNet subnet model 354 does not need to be released in an encrypted format, although it certainly can be encrypted as well.

It should also be appreciated that during the training phase operation, the automated fingerprint generation module 330 generates fingerprints and evidence for each training dataset instance, which is then stored in the evidence storage 332. As noted above, in some illustrative embodiments, the evidence may comprise the 4-tuple Ω which includes the generated fingerprint F based on the penultimate layer features, as well as the other evidence elements such as the class label Y, the identifier of the source S, and the hash digest H of the training dataset. The evidence is stored in the storage 332 which is outside the TEE 326 for purposes of permitting searching by the query module 334 when a client computing device 310, 312 identifies erroneous performance by the trained deep learning model 306 during runtime.

With reference to FIG. 3B, during runtime operation, after the deep learning model 350 has been trained using the collaborative training operation described previously and the trained deep learning model 306 is released to the training data contributors, e.g., released to the client computing devices 310, 312, the end users may then make use of the trained deep learning model 306, executing as part of the deep learning cloud service 300 to process new data 390. Just as in the training phase of operation, the new data may be provided as encrypted input data to the deep learning cloud service 300 for processing. The encrypted input data is decrypted, such as by the security module 322, to generate the original input data. The input data is input to the FrontNet subnet model 352 of the trained deep learning model 306 which generates intermediate representations (IR) that are output to the BackNet subnet model 354. The BackNet subnet model 354 then processes the IR output from the FrontNet subnet model 352 to generate a runtime result, e.g., a classification output or the like, that is provided back to the deep learning cloud service 300 and/or processing pipeline 305 for use in performing a deep learning operation based on the input data. Results of the deep learning operation may then be returned to the client computing device 310.

During this runtime operation, should an end user determine that the trained deep learning model 306 is generating erroneous outputs, e.g., erroneous classifications, the end user may submit the erroneous output Y and the fingerprint F generated for the new data processed by the trained pipeline 350 in a query to the deep learning cloud service 300. In response to receiving such a query, the query module 334 may search for similar fingerprints F with the same corresponding output Y in the evidence storage 332. For those entries found in the evidence storage 332, the corresponding source S identifiers are used to request the dataset corresponding to the entry from the training data contributor. The hash digest H may be used to verify that the training data provided in response to the request is the same dataset used to train the trained model 350. Thereafter, appropriate forensic and debugging operations may be performed to determine the root cause of the erroneous operation of the trained model 350.

As noted above, the mechanisms of the illustrative embodiments utilize specifically configured computing devices, or data processing systems, to perform the operations for training a deep learning model using a collaborative training operation that ensures privacy of the contributor training data by providing a trusted execution environment and provides model accountability via a fingerprinting mechanism. These computing devices, or data processing systems, may comprise various hardware elements which are specifically configured, either through hardware configuration, software configuration, or a combination of hardware and software configuration, to implement one or more of the systems and/or subsystems described herein. FIG. 4 is a block diagram of just one example data processing system in which aspects of the illustrative embodiments may be implemented. Data processing system 400 is an example of a computer, such as server 304A in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System p° computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for executed by one or more hardware processors, such as processing unit 406, or the like. As such, the computing device shown in FIG. 4 becomes specifically configured to implement the mechanisms of the illustrative embodiments and specifically configured to perform the operations and generate the outputs described herein with regard to the deep learning cloud service implementing the privacy enhancing deep learning cloud service framework and one or more processing pipelines.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3A-3B and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
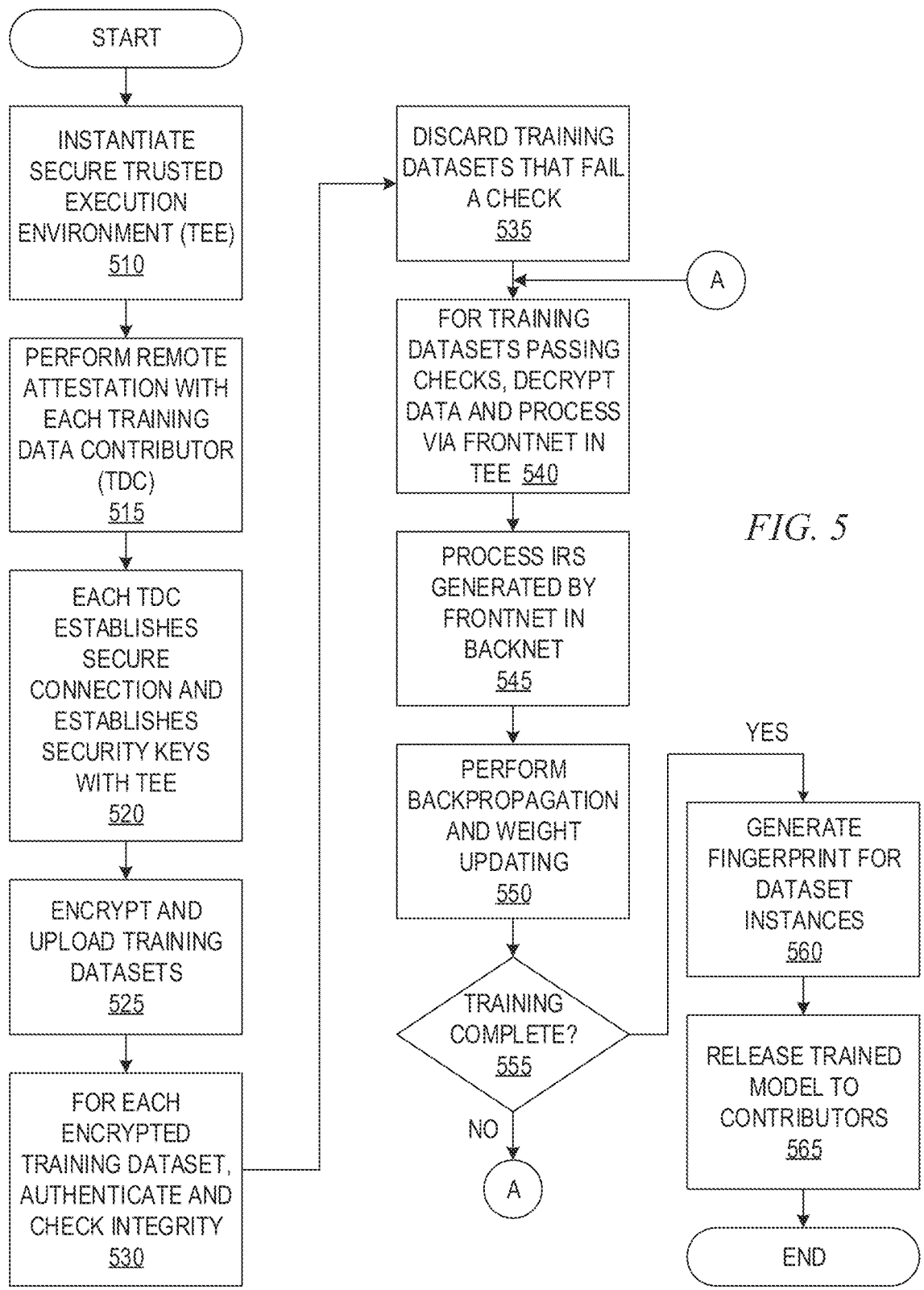
FIG. 5 is a flowchart outlining an example operation for performing verifiable deep learning collaborative training in accordance with one illustrative embodiment.

FIG. 5 is a flowchart outlining an example operation for performing verifiable deep learning collaborative training in accordance with one illustrative embodiment. As shown in FIG. 5, the operation starts with the verifiable deep learning training service infrastructure provider instantiating a secure trusted execution environment (TEE) on one or more server computing devices (step 510). A remote attestation is performed with each training data contributor that will be providing training datasets, or mini-batches, for training the deep learning model (step 515). Each training data contributor then establishes a secure communication connection with the TEE and establishes symmetric security keys with the TEE (step 520). The training data contributors then encrypt their training datasets using the stablished symmetric security keys and uploads the encrypted training datasets to the TEE (step 525).

For each received encrypted training dataset, at the TEE, the received encrypted dataset from the contributor is authenticated with the provisioned security key for that contributor and the integrity of the encrypted dataset is checked (step 530). If any check fails, the encrypted training dataset is discarded (step 535). If all checks are passed, then the received encrypted training dataset is decrypted and processed via a FrontNet subnet model of the deep learning model executing within the TEE (step 540). The FrontNet subnet model passes intermediate representations (IRs) to the BackNet subnet model executing outside the TEE which processes the IRs to generate an output result (step 545). Backpropagation and weight updating is performed to train the deep learning model (step 550) and a determination is made as to whether the output result is sufficient to warrant discontinuing the training of the deep learning model (step 555). If not, then the operation is repeated with the next iteration of training data. If the training has completed, then the fingerprints for the dataset instances are generated based on the trained deep learning model (step 560) and the trained deep learning model is released to the training dataset contributors (step 565). The operation then terminates.

Figure 6:
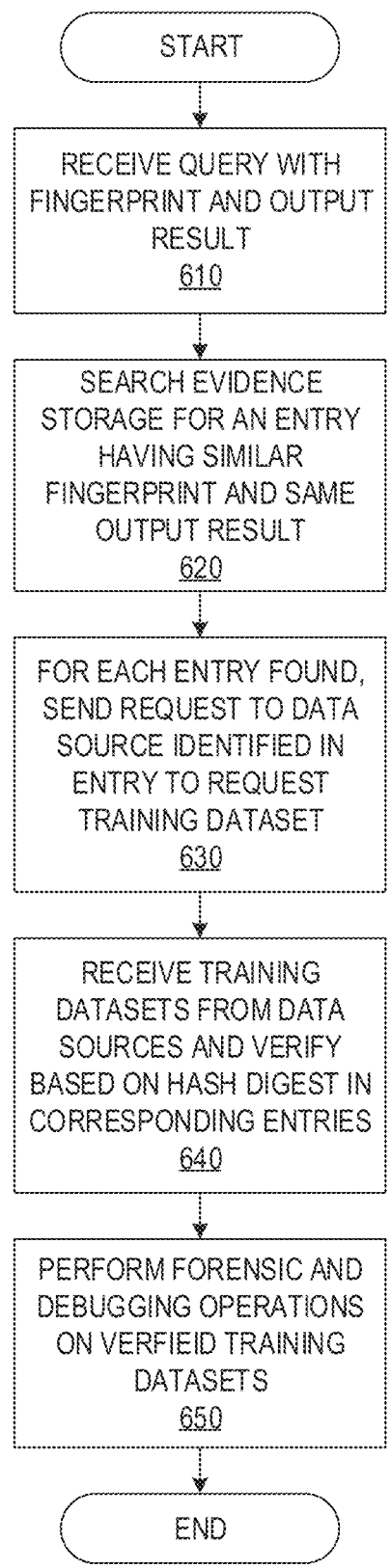
FIG. 6 is a flowchart outlining an example operation for performing a query operation on a fingerprint in accordance with one illustrative embodiment.

FIG. 6 is a flowchart outlining an example operation for performing a query operation on a fingerprint in accordance with one illustrative embodiment. As shown in FIG. 6, the operation starts by receiving a query from a client computing device (step 610). The query includes a fingerprint and an output result generated by a trained deep learning model processing new data. In response to receiving the query, a query module of the verifiable deep learning training service searches an evidence storage for an entry having a similar fingerprint and same output result (step 620). A similar fingerprint may be determined using, for example, the distance calculations discussed previously.

For each entry in the evidence storage that has a similar fingerprint and the same output, requests are sent to the data sources identified in the entries to request the original training dataset instance corresponding to the entry (step 630). The original training datasets are received and a hash digest specified in the corresponding entry in the evidence storage is used to verify that the received original training datasets are in fact the same datasets used to train the deep learning model (step 640). Assuming that the verification is successful via the hash digest, forensic and debugging operations are performed using the received training datasets (step 650) to identify the root cause of the erroneous operation of the deep learning model. The operation then terminates.

Thus, the illustrative embodiments provide a verifiable deep learning training service framework that maintains the privacy of training data contributors training datasets by providing a trusted execution environment in which a portion of the deep learning model executes on the unencrypted training data, both of which are encrypted outside of the trusted execution environment and not accessible within the trusted execution environment. Moreover, the verifiable deep learning training service frameworks provides model accountability through a fingerprint mechanism that fingerprints each training dataset instance and provides a query capability to determine which dataset instances may have contributed to an erroneous training of the deep learning model.

Embodiments of the present invention are capable of being implemented in conjunction with any type of computing environment now known or later developed. In some illustrative embodiments, the mechanisms of the illustrative embodiments are implemented on cloud computing systems, however implementation of the teachings recited herein are not limited to a cloud computing environment. Various types of distributed data processing system environments may be utilized to implement the mechanisms of the illustrative embodiments.

Assuming a cloud computing embodiment is utilized, it should be appreciated that cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of a cloud model are as follows:

(1) On-demand self-service: a cloud consumer can unilaterally provision computing capabilities, such as server time and network storage, as needed automatically without requiring human interaction with the service's provider.

(2) Broad network access: capabilities are available over a network and accessed through standard mechanisms that promote use by heterogeneous thin or thick client platforms (e.g., mobile phones, laptops, and PDAs).

(3) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

(4) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

(5) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

(1) Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(2) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

(1) Private cloud: the cloud infrastructure is operated solely for an organization. It may be managed by the organization or a third party and may exist on-premises or off-premises.

(2) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

(3) Public cloud: the cloud infrastructure is made available to the general public or a large industry group and is owned by an organization selling cloud services.

(4) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
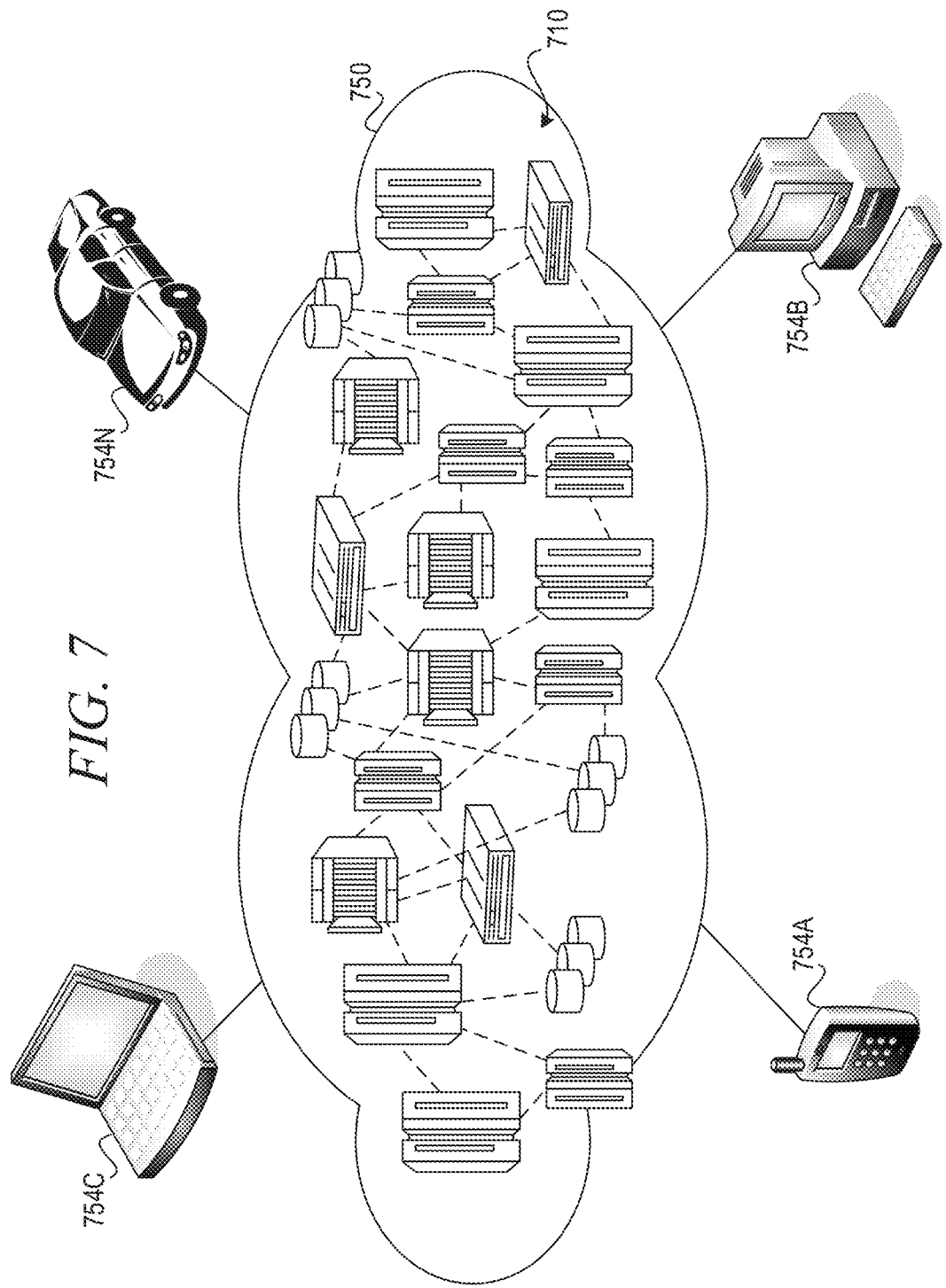
FIG. 7 depicts a cloud computing environment according to an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
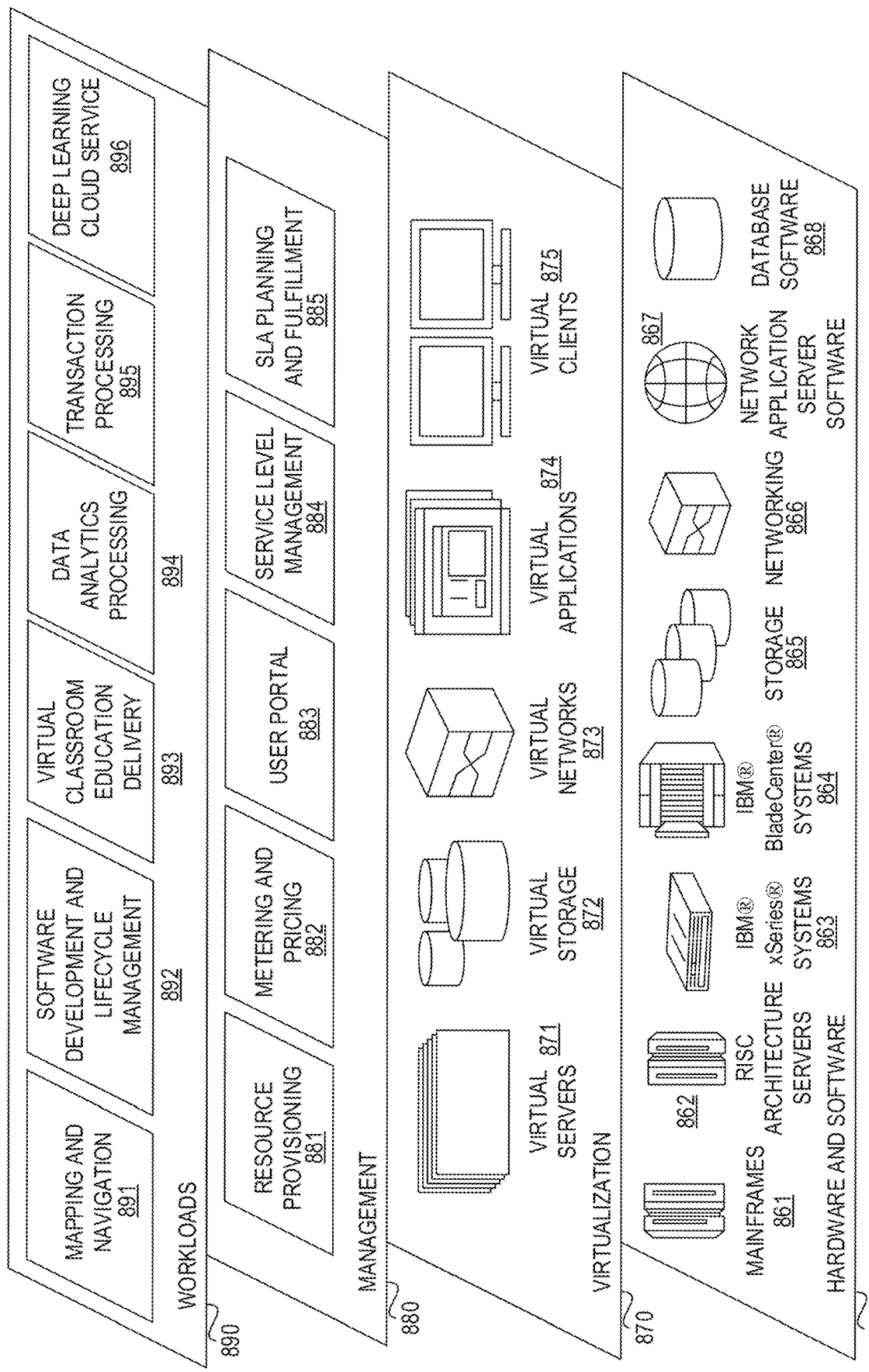
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

(1) Hardware and software layer 860 includes hardware and software components. Examples of hardware components include: mainframes 861; RISC (Reduced Instruction Set Computer) architecture based servers 862; servers 863;

blade servers 864; storage devices 865; and networks and networking components 866. In some embodiments, software components include network application server software 867 and database software 868.

(2) Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and deep learning cloud computing service processing 896. The deep learning cloud computing service processing 896 may comprise the pipelines and verifiable deep learning training service framework previously described above with regard to one or more of the described illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising:
   executing, by a deep learning training service framework, a FrontNet subnet model of a deep learning model in a trusted execution environment of the deep learning training service framework;
   executing, by the deep learning training service framework, a BackNet subnet model of the deep learning model in the deep learning training service framework external to the trusted execution environment, wherein the FrontNet subnet model comprises a first predetermined number of consecutive layers of the deep learning model from an input layer of the deep learning model to an intermediate layer, and wherein the BackNet subnet model comprises a second predetermined number of consecutive layers of the deep learning model from a layer, subsequent to the intermediate layer, to an output layer of the deep learning model;
   decrypting, by a security module executing within the trusted execution environment, one or more encrypted training datasets;
   training, by training logic of the deep learning training service framework, the FrontNet subnet model and BackNet subnet model of the deep learning model based on the decrypted training datasets, wherein the FrontNet subnet model is trained within the trusted execution environment and provides intermediate representations to the BackNet subnet model which is trained external to the trusted execution environment using the intermediate representations;

releasing, by the deep learning training service framework, a trained deep learning model comprising a trained FrontNet subnet model and a trained BackNet subnet model, to one or more client computing devices; and generating, by a fingerprint generation module executing within the trusted execution environment, one or more first fingerprint data structures for the one or more training datasets, wherein each first fingerprint data structure comprises a fingerprint that is a normalized feature embedding of a penultimate layer of the Back-Net subnet model.

2. The method of claim 1, wherein:

the one or more client computing devices comprises a plurality of computing devices associated with a plurality of different training dataset providers, and wherein the security module executing within the trusted execution environment prevents training dataset providers from accessing training datasets provided by other training dataset providers, and each of the training datasets provided by the different training dataset providers are used during the training of the FrontNet subnet model and the BackNet subnet model of the deep learning model to generate the trained deep learning model, and wherein the same trained deep learning model is released to each of the different training dataset providers with the FrontNet subnet model encrypted with an encryption key specific to the training dataset provider.

3. The method of claim 1, further comprising:

receiving, by the deep learning training service framework, the one or more encrypted training datasets from the one or more client computers; and in response to receiving the one or more encrypted training datasets:

prior to decrypting the one or more encrypted training datasets, authenticating, by the security module, training dataset providers of the one or more training dataset providers; and discarding, by the security module, any training datasets from training dataset providers that do not pass the authentication from further use during training of the FrontNet subnet model and BackNet subnet model of the deep learning model.

4. The method of claim 3, further comprising, in response to receiving the one or more encrypted training datasets:

verifying, by the security module, the integrity of the one or more training datasets; and discarding, by the security module, any training datasets that do not pass the verification from further use during training of the FrontNet subnet model and BackNet subnet model of the deep learning model.

5. The method of claim 1, further comprising:

generating, by a fingerprint generation module executing within the trusted execution environment, one or more first fingerprint data structures for the one or more training datasets, wherein each first fingerprint data structure comprises a fingerprint that is a feature embedding of a selected layer of the deep learning model; and storing, by the fingerprint generation module, the generated one or more first fingerprint data structures in an evidence storage.

6. The method of claim 5, further comprising:

processing, by the trained deep learning model, new input data to generate an output result and a second fingerprint data structure corresponding to the new input data;

receiving, from a client device of the one or more client devices, a query comprising the second fingerprint data structure;

searching, by a query module executing in the deep learning training service framework, the evidence storage for a first fingerprint data structure similar to the second fingerprint data structure based on a distance function that measures a similarity between embeddings of the fingerprint data structures in the evidence storage and the second fingerprint data structure, and identifying the first fingerprint data structure as a fingerprint data structure in the evidence storage having a smallest distance; and identifying, by the query module, a training dataset, of the one or more training datasets, and a corresponding training dataset provider based on an entry in the evidence storage corresponding to the first fingerprint data structure.

7. The method of claim 6, further comprising:

performing at least one of a debugging operation or a root cause analysis on the trained deep learning model based on the identified training dataset and identified corresponding training dataset provider.

8. The method of claim 1, further comprising:

negotiating, with a plurality of the training dataset providers, a customized partitioning point hyperparameter for the training dataset provider prior to training a corresponding instance of the deep learning model, wherein the customized partitioning point defines one of a last intermediate layer of the FrontNet subnet model or a first layer of the BackNet subnet model, and wherein the partitioning point hyperparameter is different for at least two of the training dataset providers; and configuring, for each instance of the deep learning model corresponding to each of the one or more training dataset providers, the first predetermined number of consecutive layers of the FrontNet subnet model and the second predetermined number of consecutive layers of the BackNet subnet model based on the customized partitioning point hyperparameter for the training dataset provider.

9. The method of claim 5, wherein generating one or more first fingerprint data structures for the one or more training datasets comprises generating, for each training data instance in the one or more training datasets, a first fingerprint data structure comprising a tuple data structure that specifies a fingerprint, a class label of the training data instance used to train the deep learning model, a data source identifier, and a hash digest of the training data instance.

10. The method of claim 9, wherein the fingerprint in the tuple data structure is a normalized feature embedding of a penultimate layer of the BackNet subnet model.

11. The method of claim 1, further comprising:

processing a query comprising a second fingerprint data structure based on the one or more first fingerprint data structures to identify a training dataset corresponding to a first fingerprint data structure based on a similarity evaluation of the fingerprints corresponding to the one or more fingerprint data structures and a second fingerprint corresponding to the second fingerprint data structure.

12. The method of claim 11, further comprising:
performing an operation on the trained deep learning model based on the identified training dataset, wherein the operation comprises one or more of a debugging operation or a root cause analysis operation.

13. A computer program product comprising a computer readable storage medium having a computer readable program stored therein, wherein the computer readable program, when executed on a data processing system, causes the data processing system to implement a deep learning training service framework configured to:
execute a FrontNet subnet model of a deep learning model in a trusted execution environment of the deep learning training service framework;
execute a BackNet subnet model of the deep learning model in the deep learning training service framework external to the trusted execution environment, wherein the FrontNet subnet model comprises a first predetermined number of consecutive layers of the deep learning model from an input layer of the deep learning model to an intermediate layer, and wherein the BackNet subnet model comprises a second predetermined number of consecutive layers of the deep learning model from a layer, subsequent to the intermediate layer, to an output layer of the deep learning model;
decrypt, by a security module executing within the trusted execution environment, one or more encrypted training datasets;
train, by training logic of the deep learning training service framework, the FrontNet subnet model and BackNet subnet model of the deep learning model based on the decrypted training datasets, wherein the FrontNet subnet model is trained within the trusted execution environment and provides intermediate representations to the BackNet subnet model which is trained external to the trusted execution environment using the intermediate representations;
release a trained deep learning model comprising a trained FrontNet subnet model and a trained BackNet subnet model, to one or more client computing devices; and
generate, by a fingerprint generation module executing within the trusted execution environment, one or more first fingerprint data structures for the one or more training datasets, wherein each first fingerprint data structure comprises a fingerprint that is a normalized feature embedding of a penultimate layer of the BackNet subnet model.

14. The computer program product of claim 13, wherein:
the one or more client computing devices comprises a plurality of computing devices associated with a plurality of different training dataset providers, and wherein the security module executing within the trusted execution environment prevents training dataset providers from accessing training datasets provided by other training dataset providers, and
each of the training datasets provided by the different training dataset providers are used during the training of the FrontNet subnet model and the BackNet subnet model of the deep learning model to generate the trained deep learning model, and wherein the same trained deep learning model is released to each of the different training dataset providers with the FrontNet subnet model encrypted with an encryption key specific to the training dataset provider.

15. The computer program product of claim 13, wherein the computer readable program further configures the deep learning training service framework to receive the one or more encrypted training datasets from the one or more client computers and, in response to receiving the one or more encrypted training datasets, to:
authenticate, prior to decrypting the one or more encrypted training datasets, by the security module, training dataset providers of the one or more training dataset providers; and
discard, by the security module, any training datasets from training dataset providers that do not pass the authentication from further use during training of the FrontNet subnet model and BackNet subnet model of the deep learning model.

16. The computer program product of claim 15, wherein the computer readable program further configures the deep learning training service framework, in response to receiving the one or more encrypted training datasets, to:
verify, by the security module, the integrity of the one or more training datasets; and
discard, by the security module, any training datasets that do not pass the verification from further use during training of the FrontNet subnet model and BackNet subnet model of the deep learning model.

17. The computer program product of claim 13, wherein the computer readable program further configures the deep learning training service framework to:
generate, by a fingerprint generation module executing within the trusted execution environment, one or more first fingerprint data structures for the one or more training datasets, wherein each first fingerprint data structure comprises a fingerprint that is a feature embedding of a selected layer of the deep learning model; and
store, by the fingerprint generation module, the generated one or more first fingerprint data structures in an evidence storage.

18. The computer program product of claim 17, wherein the computer readable program further configures the deep learning training service framework to:
process, by the trained deep learning model, new input data to generate an output result and a second fingerprint data structure corresponding to the new input data,
receive, from a client device of the one or more client devices, a query comprising the second fingerprint data structure;
search, by a query module executing in the deep learning training service framework, the evidence storage for a first fingerprint data structure similar to the second fingerprint data structure based on a distance function that measures a similarity between embeddings of the fingerprint data structures in the evidence storage and the second fingerprint data structure, and identifying the first fingerprint data structure as a fingerprint data structure in the evidence storage having a smallest distance; and
identify, by the query module, a training dataset, of the one or more training datasets, and a corresponding training dataset provider based on an entry in the evidence storage corresponding to the first fingerprint data structure.

19. A system, comprising:
at least one processor; and
at least one memory coupled to the at least one processor, wherein the at least one memory comprises instructions which, when executed by the at least one processor, cause the at least one processor to implement a deep learning training service framework configured to:

execute a FrontNet subnet model of a deep learning model in a trusted execution environment of the deep learning training service framework;

execute a BackNet subnet model of the deep learning model in the deep learning training service framework external to the trusted execution environment, wherein the FrontNet subnet model comprises a first predetermined number of consecutive layers of the deep learning model from an input layer of the deep learning model to an intermediate layer, and wherein the BackNet subnet model comprises a second predetermined number of consecutive layers of the deep learning model from a layer, subsequent to the intermediate layer, to an output layer of the deep learning model;

decrypt, by a security module executing within the trusted execution environment, one or more encrypted training datasets;

train, by training logic of the deep learning training service framework, the FrontNet subnet model and BackNet subnet model of the deep learning model based on the decrypted training datasets, wherein the FrontNet subnet model is trained within the trusted execution environment and provides intermediate representations to the BackNet subnet model which is trained external to the trusted execution environment using the intermediate representations;

release a trained deep learning model comprising a trained FrontNet subnet model and a trained BackNet subnet model, to one or more client computing devices; and generate, by a fingerprint generation module executing within the trusted execution environment, one or more first fingerprint data structures for the one or more training datasets, wherein each first fingerprint data structure comprises a fingerprint that is a normalized feature embedding of a penultimate layer of the BackNet subnet model.

\* \* \* \* \*